United States Patent
Brodersen et al.

(10) Patent No.: US 6,684,438 B2
(45) Date of Patent: *Feb. 3, 2004

(54) METHOD OF USING CACHE TO DETERMINE THE VISIBILITY TO A REMOTE DATABASE CLIENT OF A PLURALITY OF DATABASE TRANSACTIONS

(75) Inventors: Robert S. Brodersen, Redwood City, CA (US); Peter S. Lim, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/206,850

(22) Filed: Jul. 25, 2002

(65) Prior Publication Data

US 2003/0135523 A1 Jul. 17, 2003

Related U.S. Application Data

(63) Continuation of application No. 09/373,798, filed on Aug. 13, 1999, now Pat. No. 6,446,089, which is a continuation of application No. PCT/US98/03753, filed on Feb. 24, 1998.
(60) Provisional application No. 60/039,811, filed on Feb. 26, 1997.

(51) Int. Cl.[7] .............................................. G06F 17/30
(52) U.S. Cl. ..................... 707/201; 707/6; 707/10; 707/101; 709/226; 709/231
(58) Field of Search .................... 707/200–204, 707/6, 9–10, 101–103; 709/226, 231

(56) References Cited

U.S. PATENT DOCUMENTS

| 5,434,994 A | * | 7/1995 | Shaheen et al. | ............. 709/223 |
|---|---|---|---|---|
| 5,758,337 A | * | 5/1998 | Hammond | ...................... 707/6 |
| 5,924,094 A | * | 7/1999 | Sutter | ........................... 707/10 |
| 6,189,011 B1 | * | 2/2001 | Lim et al. | ................... 707/102 |
| 6,446,089 B1 | * | 9/2002 | Brodersen et al. | .......... 707/201 |

\* cited by examiner

*Primary Examiner*—John E. Breene
*Assistant Examiner*—Mohammad Ali
(74) *Attorney, Agent, or Firm*—James W. Soong; Perkins Coie LLP

(57) ABSTRACT

Updates made to a central database (3) or to another partially replicated database (23-1) are selectively propagated to a partially replicated database (23-2) if the owner of the partially replicated database (23-2) is deemed to have visibility to the data being updated. Visibility is determined by use of predetermined rules stored in a rules database. Stored rules are assessed against data content of various tables that make up a logical entity, known as a docking object that is being updated. The stored rules are assessed against data content of various tables that make up a docking object, not necessarily being the docking object that is being updated. The visibility rules of these related docking objects are recursively determined. Changes in visibility are determined to enable the central computer to direct the nodes to insert the docking object into its partially replicated database. The predetermined rules are in a declarative form and specify visibility of data based upon structure of the data without reference to data content. Database objects and transactions have an associated visibility strength used to determine the visibility of a transaction to an object.

20 Claims, 9 Drawing Sheets

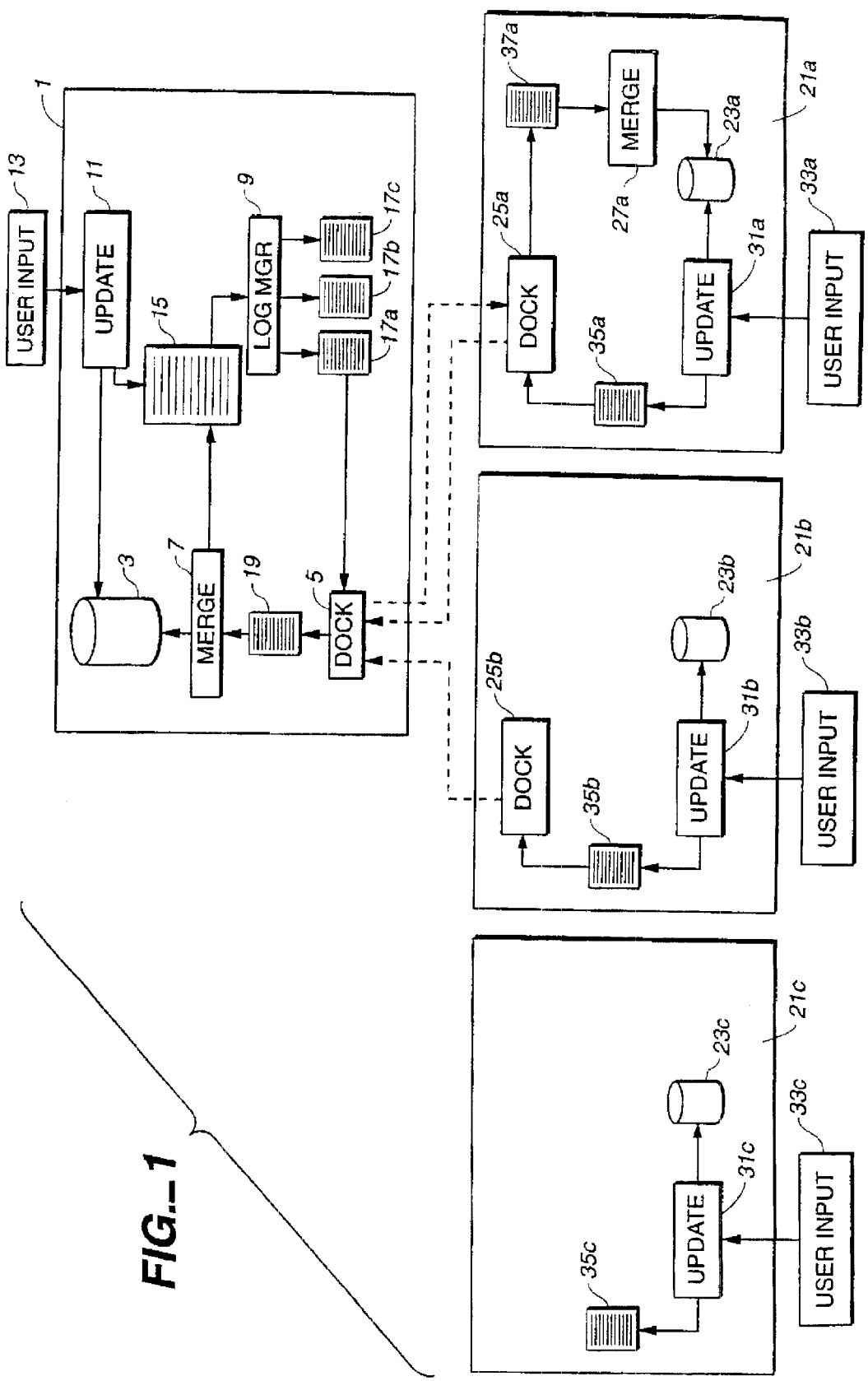
FIG._1

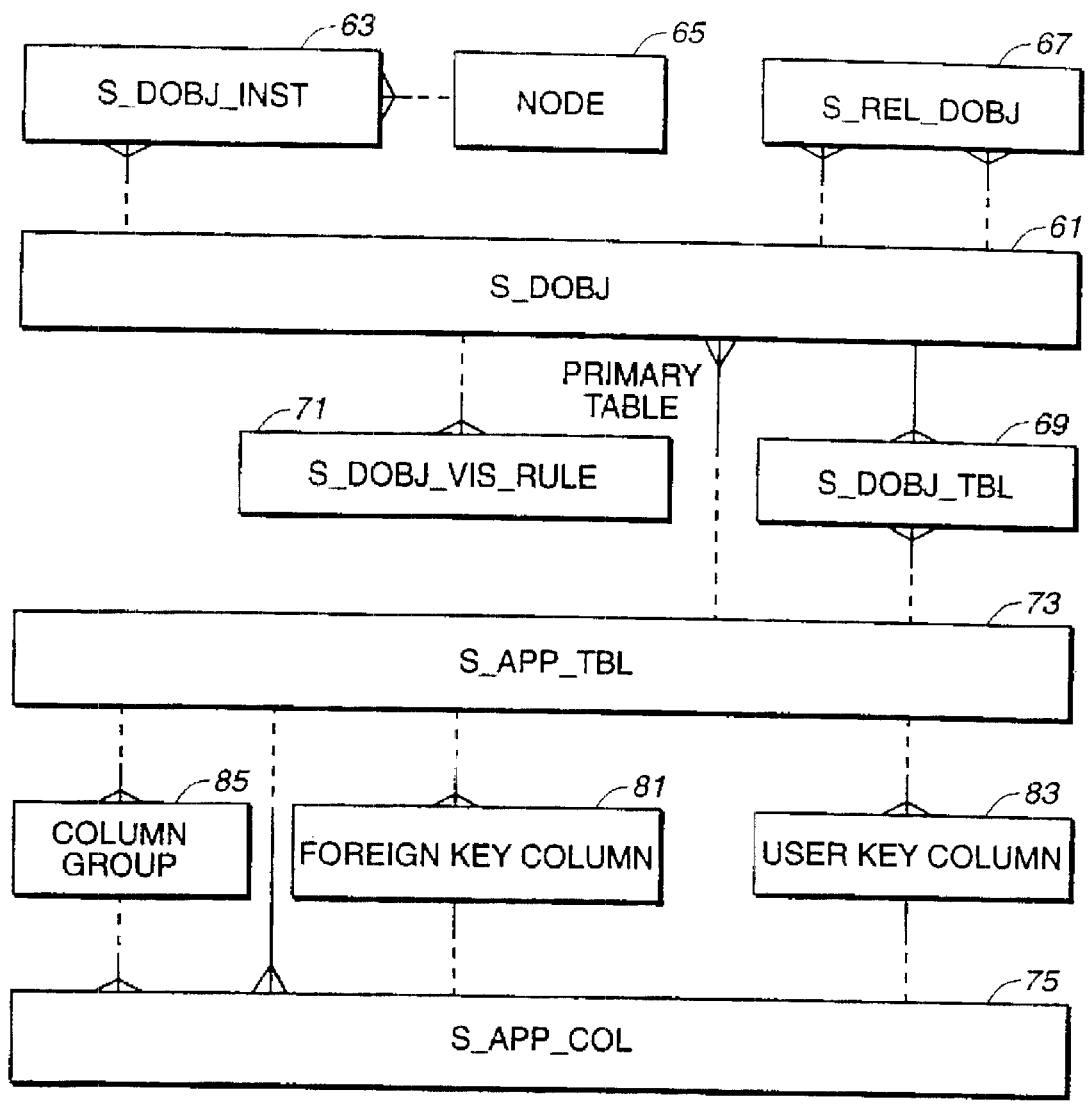
FIG._2

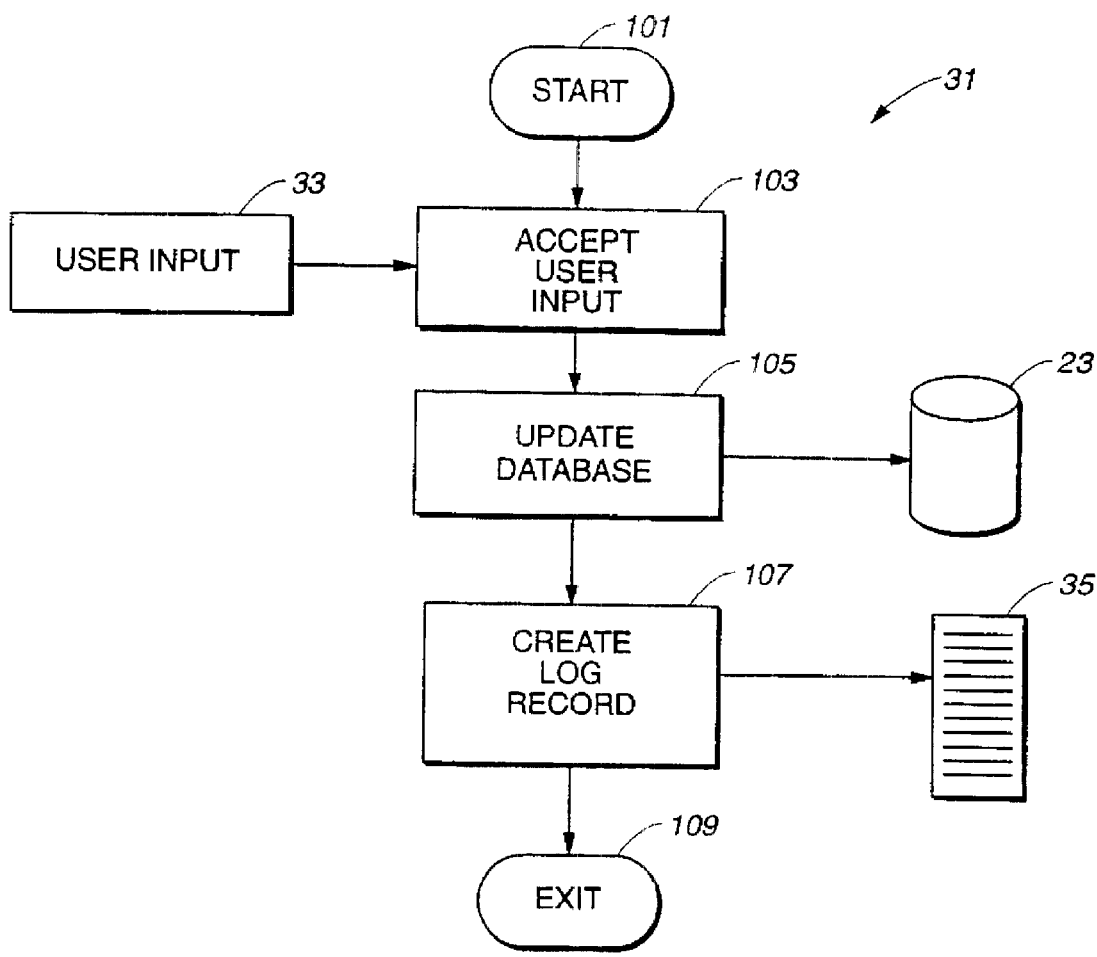
FIG._3

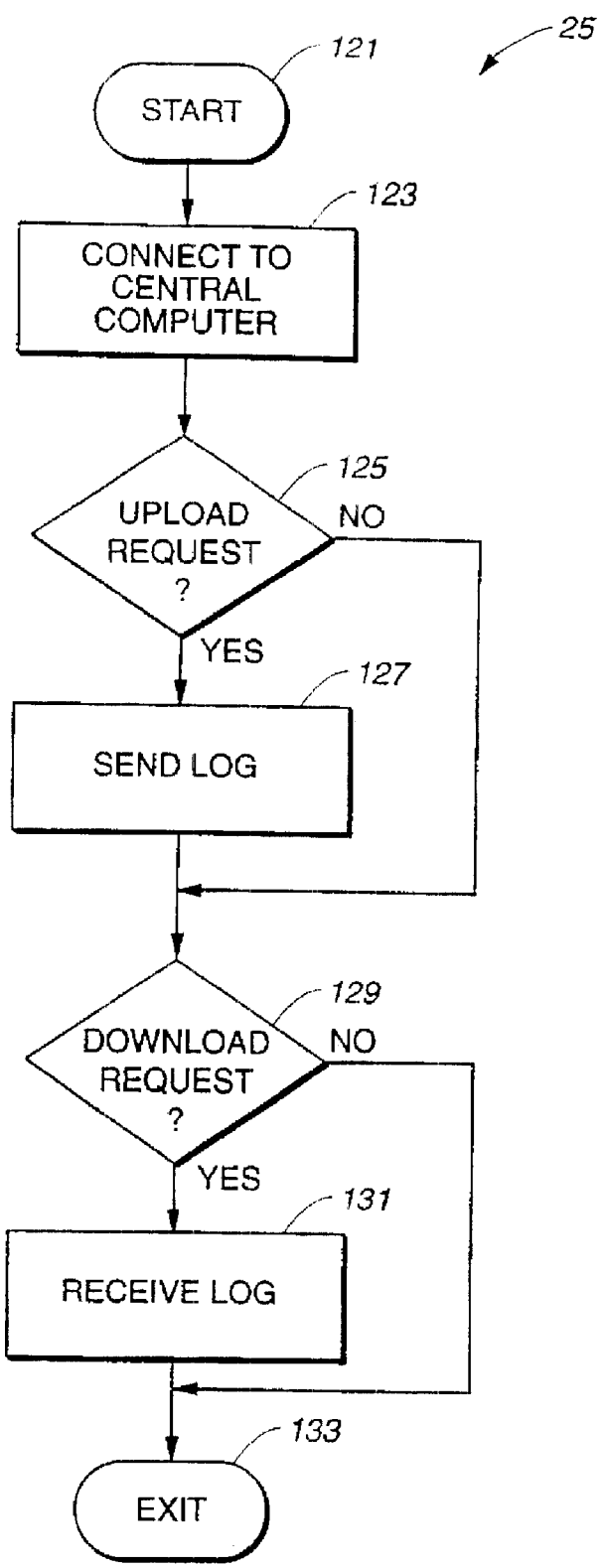
FIG._4

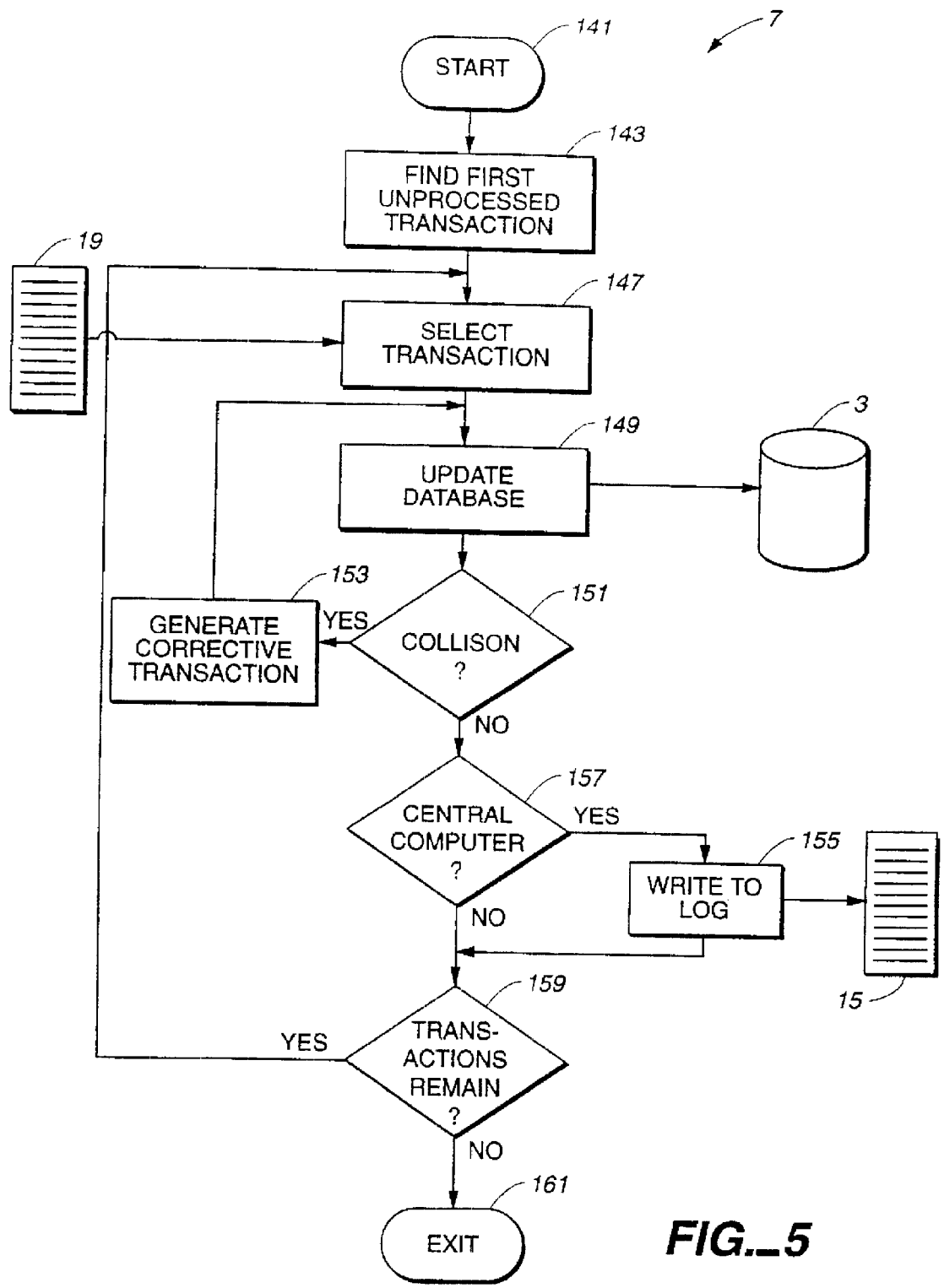
FIG._5

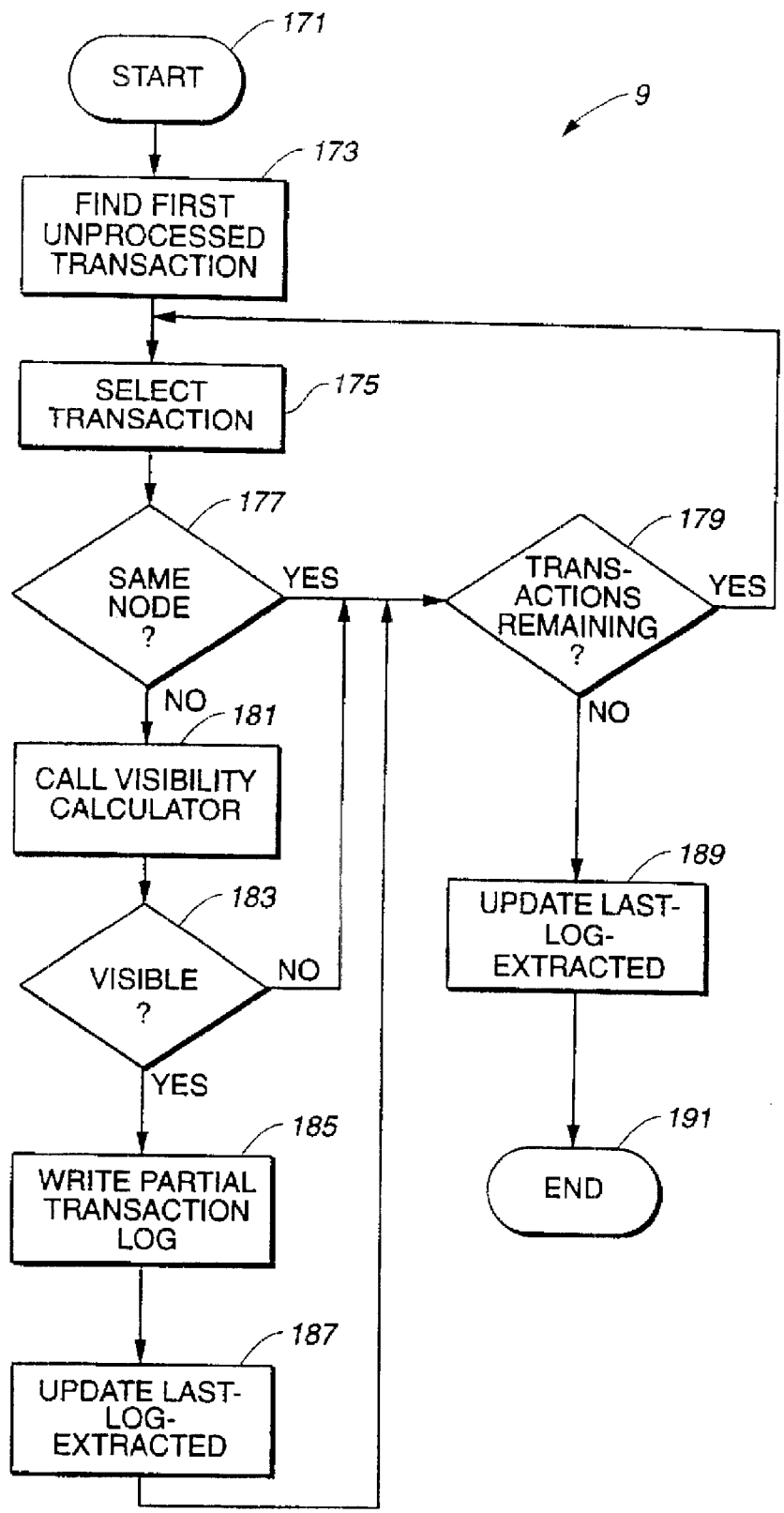
FIG._6

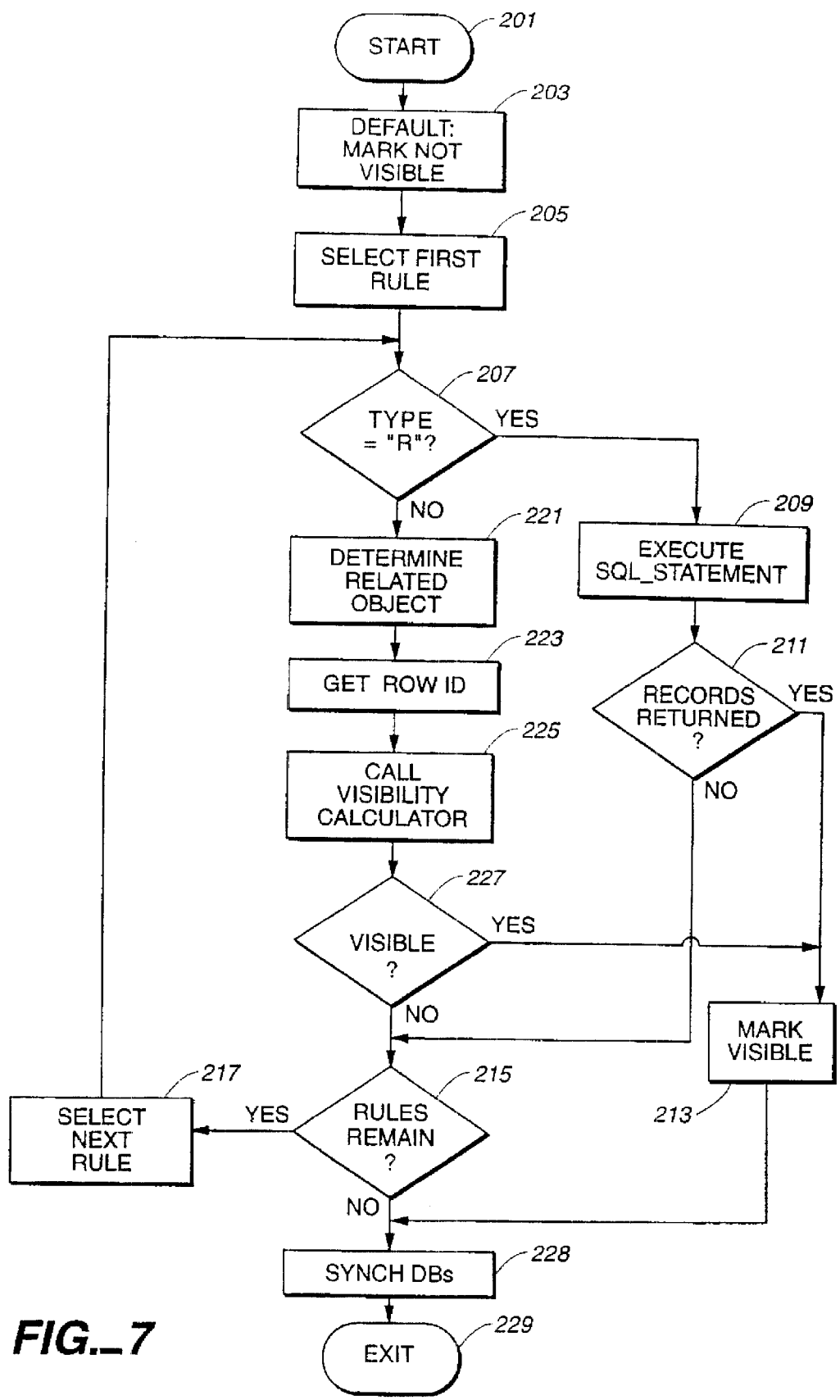
FIG._7

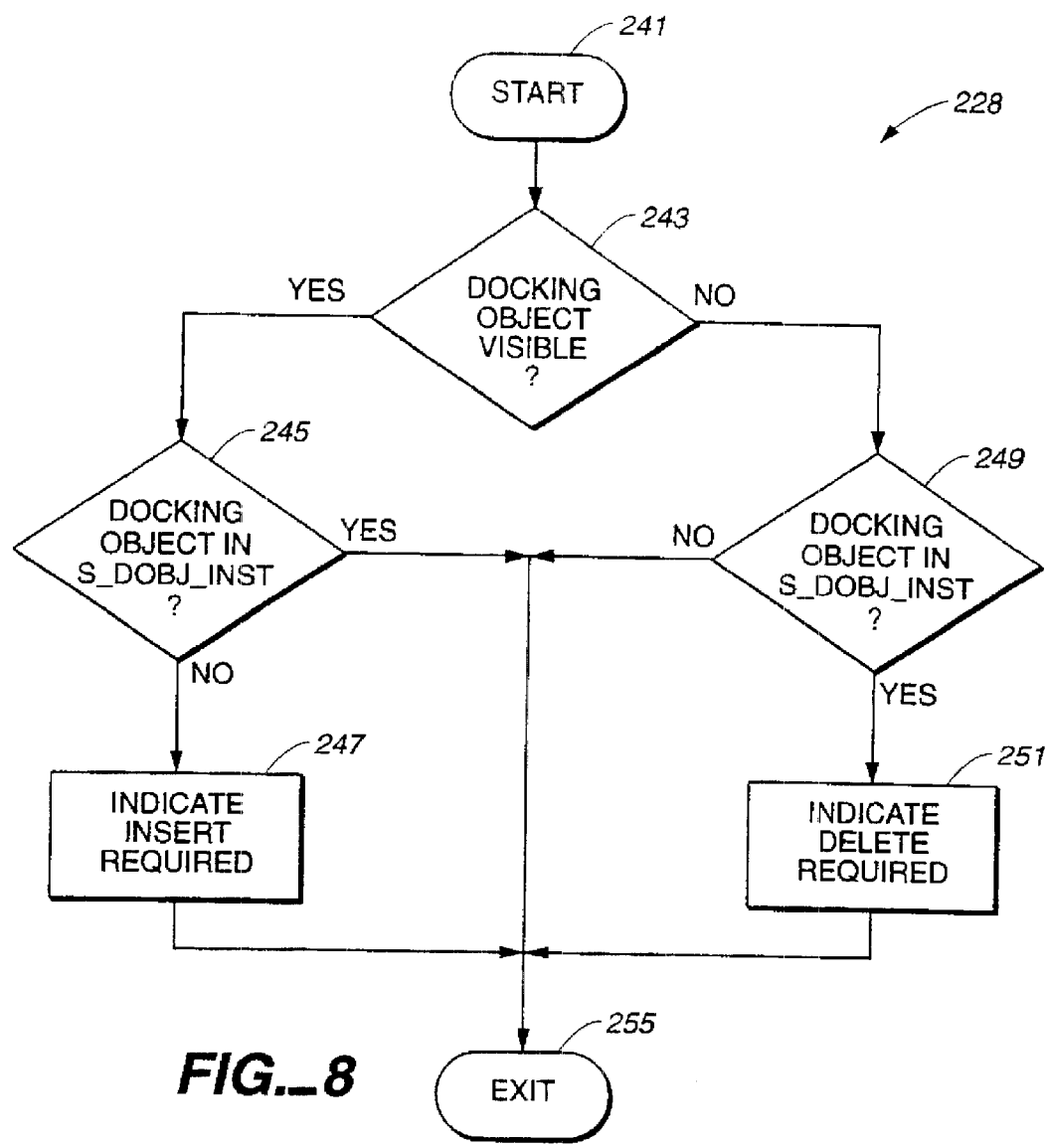
FIG._8
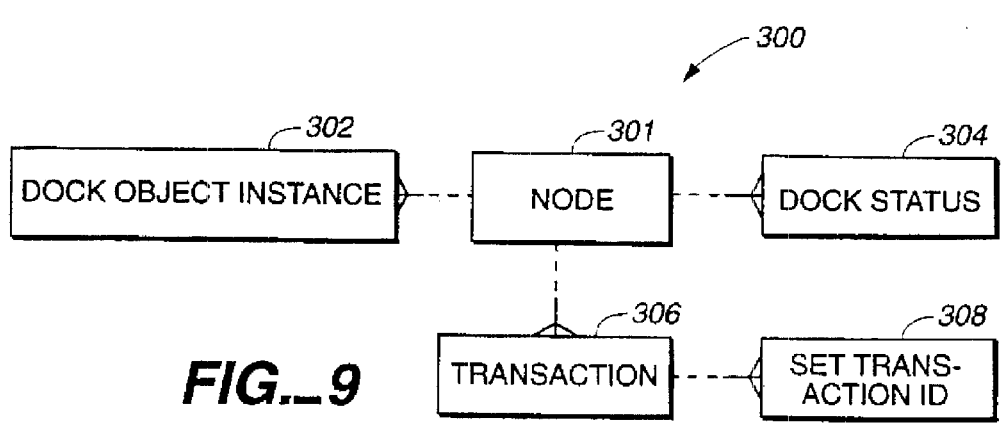
FIG._9

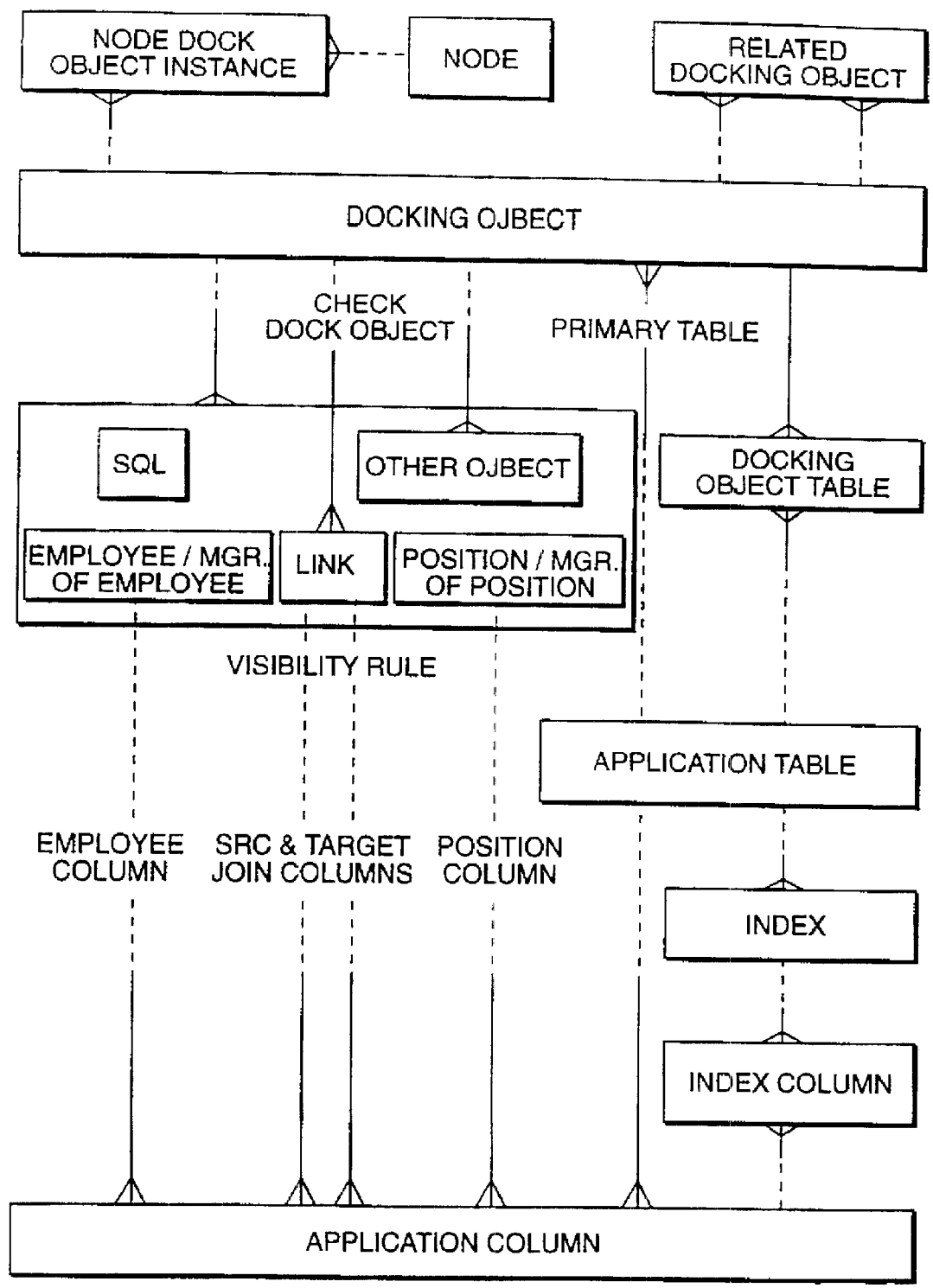
FIG._10

METHOD OF USING CACHE TO DETERMINE THE VISIBILITY TO A REMOTE DATABASE CLIENT OF A PLURALITY OF DATABASE TRANSACTIONS

This application is a continuation of U.S. application Ser. No. 09/373,798 filed Aug. 13, 1999 and issued as U.S. Pat. No. 6,446,089 which is a continuation under 35 USC § 120 of PCT International Application PCT/US98/03753 filed Feb. 24, 1998, itself claiming the benefit of U.S. Provisional Application No. 60/039,811 filed Feb. 26, 1997, each of which are incorporated by reference herein in their entirety, specifically including Appendices A and B printed in columns 31–52 of U.S. Pat. No. 6,446,089.

INTRODUCTION

I. Technical Field

This invention relates to a system and method for providing updates to a network of partially replicated relational database systems, and, more particularly, for providing an efficient means for computing the visibility to a client on the network of a transaction processed against the database.

II. Background

Relational databases are a commonly-employed data structure for representing data in a business or other environment. A relational database represents data in the form of a collection of two-dimensional tables. Each table comprises a series of cells arranged in rows and columns. Typically, a row in a table represents a particular observation. A column represents either a data field or a pointer to a row in another table.

For example, a database describing an organizational structure may have one table to describe each position in the organization, and another table to describe each employee in the organization. The employee table may include information specific to the employee, such as name, employee number, age, salary, etc. The position table may include information specific to the position, such as the position title ("salesman", "vice president", etc.), a salary range, and the like. The tables may be related by, for example, providing in each row of the employee table a pointer to a particular row in the position table, coordinated so that, for each row in the employee table, there is a pointer to the particular row in the position table that describes that employee's position. A relational database management system (RDBMS) supports "joining" these tables in response to a query from a user, so that the user making a query about, for example, a particular employee, may be provided with a report of the selected employee, including not only the information in the employee table, but also the information in the related position table.

Relational databases may be much more complex than this example, with several tables and a multiplicity of relations among them.

With the widespread use of inexpensive portable computers, it is advantageous to replicate a database onto a portable computer for reference at locations remote from the central computer. The replicated database may then be referenced by the user of the portable computer, without requiring reference to the main database, which may be maintained at a central location inconvenient to the user of the portable computer. However, there are a number of difficulties with the use of a replicated database.

One disadvantage is that a full copy of the central database may require more data storage than is desired or economical. For example, a salesman working in the field may need to refer to the database for information regarding sales opportunities in his sales area, but have no need to refer to any information regarding sales opportunities outside of his area. One possible approach to reduce the amount of required data storage is to simply replicate only that portion of the database that is needed by the user. However, this approach does not recognize that the criteria to determine which portions of the data are required is likely to vary over time. For example, the salesman may have a new city added to his territory. Under conventional approaches, the salesman would need to re-replicate his local copy of the database, this time selecting data including the added city. Such a practice is inconvenient, subject to error, and time-consuming.

A further disadvantage to a replicated database is the difficulties encountered in attempting to update data using the replicated copy. A change made to the replicated database is not made to the central database, leading to a discrepancy between the information that is stored in the replicated copy of the database and the information that is stored in the central database. Although it is possible to journal modifications made to the replicated copy and apply an identical modification to the central database, one problem that this approach faces is the possibility of colliding updates; that is, where a user of a replicated copy makes a change to data that is also changed by a user of the central copy or by the user of another replicated copy.

It is therefore desirable to provide a capability to maintain one or more partially-replicated copies of a central database, in such a way that the degree of replication may be easily changed without requiring a refresh of the entire replicated database, and that permits updates to be coordinated among users of the central database and users of the partially replicated databases.

SUMMARY OF THE INVENTION

The present invention is directed to a method of maintaining a partially replicated database in such a way that updates made to a central database, or to another partially replicated database, are selectively propagated to the partially replicated database. Updates are propagated to a partially replicated database if the owner of the partially replicated database is deemed to have visibility to the data being updated. Visibility is determined by use of predetermined rules stored in a rules database. In one aspect of the invention, the stored rules are assessed against data content of various tables that make up a logical entity, known as a docking object, that is being updated.

In another aspect of the invention, the stored rules are assessed against data content of one or more docking objects that are not necessarily updated, but that are related to a docking object being updated. In one embodiment, the visibility attributes of the related docking objects are recursively determined.

In yet another aspect of the invention, changes in visibility are determined to enable the central computer to direct the nodes to insert the docking object into its partially replicated database. Such changes in visibility are determined so as to enable the central computer to direct a node to remove a docking object from its partially replicated database.

In a further aspect of the invention, the predetermined rules are in declarative form and specify visibility of data based upon structure of the data without reference to data content.

In still another aspect of the invention, the transactions made to the database are ordered and processed in such a way as to reduce the computational resources required to calculate the visibility of the transactions.

In still another aspect of the invention, the transactions made to the database are ordered and processed using a cache in such a way as to reduce the computational resources required to calculate the visibility of the transactions.

In still another aspect of the invention, database objects and transactions have an associated visibility strength used to determine the visibility of a transaction to an object.

In still another aspect of the invention, the visibility calculations are performed using a simplified set of rules located in a central dictionary.

BRIEF DESCRIPTION OF THE DRAWINGS

FIG. 1 depicts an overview of the operation of one embodiment of the present invention.

FIG. 2 depicts a database schema that shows the relationship of the various components that make up a Docking Object.

FIG. 3 depicts steps performed by an update manager to update a database.

FIG. 4 depicts steps performed by a Docking Manager to transmit and/or receive one or more transaction logs.

FIG. 5 depicts the steps performed by a merge processor to merge transaction log records into an existing database.

FIG. 6 depicts the steps performed by a log manager to prepare a partial transaction log.

FIG. 7 depicts the steps performed by a visibility calculator for calculating visibility for a docking object as invoked by a log manager.

FIG. 8 depicts the steps performed to synchronize a partially replicated database in response to a change in data visibility.

FIG. 9 depicts the structure of the database design of the transaction log table.

FIG. 10 depicts a database diagram for the central dictionary.

DESCRIPTION OF SPECIFIC EMBODIMENTS

Overview

FIG. 1 depicts an overview of the operation of one embodiment of the present invention. FIG. 1 depicts a central computer system 1 and three remote computer systems (or "nodes") 21-a, 21-b, and 21-c. Each of nodes 21-a, 21-b and 21-c are depicted in various states of communication with central computer system 1, as will be more fully explained. Central computer system 1 includes a central database 3, a docking manager 5, a merge processor 7 and a log manager 9. Central computer system 1 additionally optionally includes update manager 11 responsive to user input 13.

Node 21-a is a remote computer system, such as a mobile client such as a laptop computer. Node 21-a includes a partially replicated remote database 23-a, update manager 31-a responsive to user input 33-a, docking manager 25-a and merge manager 27-a. In operation, update manager is responsive to user input 33-a to make changes to remote database 23-a as directed by the operator of node 21-a. Updates made are recorded, or journaled, in node update log 35-a.

At some point at the convenience of the operator of node 21-a, node docking manager 35-a is activated, and enters into communication with central docking manager 5. Update log 35-a is taken as input by node docking manager 25-a, and provided to central docking manager 5. Central docking manager 5 creates a received node update log 19, which contains all the information that had been recorded in update log 35-a. Optionally, partial log 17-a is taken as input by central docking manager 5 and provided to node docking manager 25-a, as more filly described herein.

At some point in time, at the convenience of the operator of central computer system 1, merge processor 7 is activated. Merge processor 7 takes as input received node update log 19, and applies the updates described therein to central database 3. In the process of applying the updates from received node update log 19, merge processor journals the updates applied to central update log 15. Optionally, update manager 11, responsive to user input 12 makes additional changed to central database 3 as directed by the operator of central computer system 1. The updates made by update manager 11 are additionally journaled in central update log 15.

At some point in time, at the convenience of the operator of central computer system 1, log manager 9 is activated. Log manager 9 takes as input central update log 15 and produces as output a set of partial logs 17-a, 17-b and 17-c according to visibility rules as will be further described herein. Each of partial logs 17-a, 17-b and 17-c corresponds to one of nodes 21-a, 21-b and 21-c. When a node docking manager such as node docking manager 25-a enters into communication with central docking manager 5 and optionally requests transmission of its corresponding partial log, central docking manager 5 takes as input the appropriate partial log, such as partial log 17-a, and presents it to node docking manager 25-a. Node docking manager 25-a then replicates partial log 17-a as merge log 37-a.

At some point in the future, at the convenience of the operator of node 21-a, merge processor 27-a is activated. Merge processor 27-a takes as input merge log 37-a, and applies the updates described therein to partially replicated database 23-a.

In addition to node 21-a, FIG. 1 also depicts two additional nodes 21-b and 21-c. Node 21-b is depicted in communication with central computer 1. However, unlike node 21-a, the operator of node 21-b has requested only to send his updates to central computer system 1, and has not requested to be presented with changes made elsewhere to be made to his partially replicated database 23-b. This may be, for example, if the operator has an urgent update that must be made as soon as possible, but does not have the time to receive updates from other nodes. Accordingly, FIG. 1 shows only transmission of node update log 35-a from node docking manager 25-b to central docking manager 5, and no transmission from central docking manager 5 to node docking manager 25-b. Accordingly, the merge manager for node 21-b is not activated and is not shown.

Likewise, node 21-c is depicted as not in communication with central computer system 1. Accordingly, the docking manager for node 21-c is not activated and is not shown.

By the cycle described above, updates made by each of nodes 21-a, 21-b and 21-c are presented to central computer system 1, permitting central database 3 to be updated accordingly. In addition, each of the updates made by each of the nodes 21-a, 21-b and 21-c, as well as updates made on central computer system 1, are routed back to each of nodes 21-a, 21-b, and 21-c, thereby keeping each of partial databases 23-a, 23-b and 23-c in synchronization with each other and with central database 3.

Database Structure

The synchronization of central database 3 with node databases 23-a, 23-b and 23-c is performed using a construct called a Docking Object. A Docking Object consists of Member Tables (including one Primary Table), Visibility Rules, Visibility Events, and related Docking Objects. Each docking object has a visibility level attributes as will be described more fully herein below.

A Member Table is a table of the relational database that makes up a docking object. When a docking object is propagated from central database 3 to one of node databases 23-a, 23-b or 23-c, the propagation takes the form of an insertion into each of the Member Tables associated with the particular docking object. Similarly, when a docking object is scheduled to be removed from a database, that removal consists of deleting records from the member tables associated with the docking object. For example, a docking object that represents a sales opportunity may include tables that represent the opportunity itself (e.g., named "S_OPTY"), the, product whose sale is represented by the opportunity (e.g., named "S_OPTY_PROD"), the contact for the opportunity (e.g., named "S_OPTY_CONTACT"), etc. Each of these tables is said to be a member table of the "Opportunity Docking Object." In an additional aspect of the invention, each member table row can have one or more rows that correspond to the docking object.

A Primary Table is a Member Table that controls whether a particular instance of a Docking Object is visible to a particular node. The Primary Table has a Primary Row-ID value that is used to identify a row of the Primary Table being updated, deleted or inserted. For example, the "Opportunity Docking Object" may have as a primary table the table S_OPTY. The row-id of that table, i.e., S_OPTY.row_id, is the Primary Row-ID for the Opportunity Docking Object.

Each dock object has a visibility level and a visibility level attribute that are analyzed using visibility rules. The valid values are 'Enterprise', 'Limited' and 'Private'. all member table rows in an enterprise dock object are replicated to any nodes. Membmer table rows in limited dock objects are replicated to any nodes. Member table rows in limited dock objects are subject to bisibility checks and are routed to nodes that have visibility to the rows. A Visibility Rule is a criterion that determines whether a particular instance of a Docking Object is "visible" to a particular node 21. If a Docking Object is visible to a particular node, that node will receive updates for data in the Docking Object. Visibility Rules are of two types, depending on the field RULE_TYPE. A Visibility Rule with a RULE_TYPE of "R" is referred to as an SQL Rule. An SQL Rule includes a set of Structured Query Language (SQL) statements that is evaluated to determine if any data meeting the criteria specified in the SQL statements exists in the Docking Object. If so, the Docking Object is visible to the node. A Visibility Rule with a RULE_TYPE of "O" is referred to as a Docking Object Rule. A Docking Object Rule specifies another Docking Object to be queried for visibility. If the specified Docking Object is visible, then the Docking Object pointing to it is also visible.

A Related Docking Object is a Docking Object that is propagated or deleted when the Docking Object under consideration is propagated or deleted. For example, an Opportunity Docking Object may have related Docking Objects representing the sales contacts, the organizations, the products to be sold, and the activities needed to pursue the opportunity. When an Opportunity Docking Object is propagated from Central Database 3 to one of node databases 23, the related docking objects are also propagated.

FIG. 2 depicts a database schema that shows the relationship of the various components that make up a Docking Object. The schema is a meta-database, in that it does not describe the data being accessed in the database. Rather, the schema is a separate database that defines the structure of the database being accessed. That is, it is a database comprising tables that describe the relationships and data contexts of another database.

Each of the tables shown in FIG. 2 is a table in a relational database, and as such is in row-column form. Many columns represent fields that are common to all the illustrated tables. Such fields include for example, a ROW_ID to identify a particular row in the table, as well as fields to track the date and time that a row was created and last modified, and the identity of the user who created or modified the row. In addition, each table contains fields specific to that table, and which are described in detail below.

Table S_DOBJ 61 describes the Docking Objects in an application. Table S_DOBJ 61 includes the fields OBJ_NAME and PRIMARY_TABLE_ID. Field OBJ_NAME defines the name of the Docking Object being described. Field PRIMARY_TABLE_ID is used to identify the primary table associated with this Docking Object.

Table S_DOBJ_INST 63 describes whether a particular instance of a Docking Object, described by table S_DOBJ 61, is present on a particular node's database. Table S_DOBJ_INST 63 includes the fields NODE_ID, DOBJ_ID and PR_TBL_ROW_ID. Field NODE_ID points to a particular node table 65. Field DOBJ_ID points to the Docking Object to which the Docking Object instance applies. Field PR_TBL_ROW_ID is used to select a particular row in the Primary Table of the Docking Object. This value identifies the Docking Object instance.

Table S_REL_DOBJ 67 describes the related Docking Objects of a particular Docking Object, described by table S_DOBJ 61. Table S_REL_DOBJ 67 includes the fields DOBJ_ID, REL_DOBJ_ID, and SQL_STATEMENT. Field DOBJ_ID identifies the Docking Object that owns a particular related Docking Object. Field REL_DOBJ_ID identifies the related Docking Object that is owned by the Docking Object identified by DOBJ_ID. Field SQL_STATEMENT is an SQL statement that may be executed to obtain the Primary ID value of the related Docking Object.

Table S_DOBJ_TBL 69 describes the member tables of a particular Docking Object, described by table S_DOBJ 61. Table S_DOBJ_TBL 69 includes the fields DOBJ_ID, TBL_ID, and VIS_EVENT_FLG. Field DOBJ_ID identifies the Docking Object that contains the member table described by the row. Field TBL_ID identifies the particular table in the database that is the member table described by the row. Field VIS_EVENT_FLG is a flag that indicates whether a change to this Docking Object can result in a visibility event. A value of "Y" indicates that a change can result in a visibility event; a value of "N" indicates that it cannot.

Table S_DOBJ_VIS_RULE 71 contains the visibility rules associated with a particular Docking Object. S_DOBJ_VIS_RULE 71 contains the fields DOBJ_ID, RULE_SEQUENCE, RULE_TYPE, SQL_STATEMENT and CHECK_DOBJ_ID. Field DOBJ_ID identifies the Docking Object with which a particular visibility rule is associated. Field RULE_SEQUENCE is a sequence number that indicates the sequence, relative to other visibility rules in table S_DOBJ_VIS_RULE 71, in which the particular visibility rule should be run. RULE_TYPE specifies whether the particular visibility rule is of type "R," indicating an SQL visibility rule or of type "O," indicating a Docking Object visibility rule.

If RULE_TYPE is equal to "R," field CHECK_DOBJ_ID is not meaningful, and field SQL_STATEMENT contains an SQL statement that is evaluated using the Primary ROW-ID of the primary table associated with this Docking Object and a particular Node 21. If the SQL statement returns any records, the Docking Object is deemed to be visible to the Node 21 for which visibility is being determined.

If RULE_TYPE is equal to "O," both field CHECK_DOBJ_ID and field SQL_STATEMENT are meaningful. Field CHECK_DOBJ_ID specifies a docking object whose visibility should be determined. If the specified docking object is deemed to be visible, then the docking object associated with the visibility rule is also visible. Field SQL_STATEMENT contains a SQL statement that, when executed, returns the Row-ID of the docking object identified by CHECK_DOBJ_ID that corresponds to the docking object instance associated with the visibility rule.

Table S_APP_TBL 73 is an Application Table that describes all the tables used in a particular application. It is pointed to by table S_DOBJ_TBL 69 for each member table in a docking object, and by table S_DOBJ for the primary table in a docking object. S_APP_TBL 73 points to table S_APP_COL 75, which is an Application Column Table that describes the columns of data in a particular application. S_APP_TBL 73 points to table S_APP_COL 75 directly through a primary key and indirectly through such means as a Foreign Key Column Table 81, User Key Column Table 83, and Column Group Table 85. The relationship of an Application Table, Application Column Table, Foreign Key Column Table, User Key Column Table and Column Group Table are well known in the art and are not further described.

Update Processing

FIG. 3 depicts steps performed by an update manager 31 such as update manager 31-*a*, 31-*b* or 31-*c* in updating a database, such as a node database 23-*a*, 23-*b* or 23-*c*, responsive to user input. Execution of update manager 31 begins in step 101. In step 103, the update manager 31 accepts from the user input 33 in the form of a command requesting that the data in database 23 be altered. The request may be in the form of a request to delete a row of a table, to add a row to a table, or to change the value of a cell at a particular column of a particular row in a table. In step 105, using a well-known means, the update manager 31 applies the requested update to database 23. In step 107, the update manager 31 creates a log record describing the update and writes it to update log 35.

The contents of a log record describe the update made. Each log record indicates the node identifier of the node making the update, an identification of the table being updated, and an identification of the type of update being made, i.e., an insertion of a new row, a deletion of an existing row, or an update to an existing row. For an insertion, the log record additionally includes an identifier of the row being inserted, including its primary key and the values of the other columns in the row. For a deletion, the log record identifies the primary key of the row being deleted. For an update, the log record identifies the primary key of the row being updated, the column within the row being updated, the old value of the cell at the addressed row and column, and the new value of the cell.

After writing a log record in step 107, the update processor exits for this update. The foregoing description of the update processing preferably includes additional steps not material to the present invention, for example, to assure authorization of the user to make the update, to stage and commit the write to the database to allow for rollback in the event of software or hardware failure, and the like. These steps are well-known in the art and are not described further.

An update manager 11 executing in central computer system 1 operates in an analogous manner, except that it updates central database 3 and writes its log records to central update log 11.

Docking Processing

FIG. 4 depicts steps performed by a Docking Manager 25 such as Docking Manager 25-*a*, 25-*b* or 25-*c* to transmit and/or receive one or more transaction logs. Docking Manager 25 is invoked by the user of a remote node such as node 21-*a*, 21-*b* or 21-*c*, whereby the user requests that the node dock with central computer 1 to upload an update log such as update log 35-*a* to central computer 1, to download a partial log such as partial log 17-*a*, or both. Execution of Docking Manager 25 begins in step 121. In step 123, Docking Manager 25 connects with central computer 1 under the control of Central Docking Manager 5. This connection can be any connection that enables data exchange. It is anticipated that the most common form of a connection is a telephone line used in conjunction with a modem, but other forms of data connection, such as a Local Area Network or a TCP/IP connection may also be used. Step 125 checks to see whether the user has requested that node update log 35-*a* be uploaded to the Central Computer 1. If so, execution proceeds to step 127. If not, step 127 is skipped and control is given to step 129. In step 127, Docking Manager 25 uploads its update log to central computer 1. The upload may be accomplished with any known file transfer means, such as XMODEM, ZMODEM, KERMIT, FTP, ASCII transfer, or any other method of transmitting data. In step 129, Docking Manager 25 checks to see whether the user has requested that a partial log such as partial log 17-*a* be downloaded from Central Computer 1. If so, execution proceeds to step 131. If not, step 131 is skipped and control is given to step 133. In step 131, Docking Manager 25 downloads its partial log from central computer 1. The download may be accomplished with any known file transfer means, such as XMODEM, ZMODEM, KERMIT, FTP, ASCII transfer, or any other method of transmitting data. In step 133, having completed the requested data transfer, Docking Manager 25 exits.

Merge Processing

Merge processing is performed by a processor such as node merge processor 27-*a*, 27-*b*, or 27-*c*, or central merge processor 7. The merge process serves to update its associated database with a transaction that has been entered by a user of a computer remote from the computer where merge processing is being performed. Merge processing is analogous to update processing and is similar in form to update processing as previously disclosed with reference to FIG. 3, with three differences. First, the input to a merge processor is not an update entered directly by a user, but rather is a log file that is obtained from a computer remote from the computer where the merge is executing. A second difference is that, as shown by in FIG. 1, merge processing does not produce a log when performed at a node. The function of a log on a node is to record a transaction for propagation to Central Computer system 1 and thence to other nodes as required. A transaction that is the subject of a merge in a node has been communicated to Central Computer System 1, and there is no need to re-communicate it.

A third difference is that merge processing must be capable of detecting and resolving multiple conflicting transactions. For example, assume that a field contains the value "Keith Palmer." Assume further that a user at node 27-*a* enters a transaction to update that field to "Carl Lake," and a user at node 27-*b* enters a transaction to update the same field to "Greg Emerson." Without collision detection, data among various nodes may become corrupt. When the transaction for user 27-*a* is merged, the field is updated from "Keith Palmer" to "Carl Lake." Without collision handling, when the transaction for node 27-*b* is merged, the field would be updated to "Greg Emerson," and the central database would then be out of synch with the database of node 27-*a*. Furthermore, when merge processing is performed on each of nodes 27-*a* and 27-*b*, each node will update its database with the other's transactions, leaving at least one node out of synch with the other node and with central database.

Therefore, merge processing must also have a means of detecting collisions and correcting them. In the above example, a simple way to detect and correct a collision is to compare the value in the database to the value that the merge log reflects as being the previous value in the node database. If the two values do not match, Merge processor 7 may reject the transaction and generate a corrective transaction to be sent to the node from which the conflicting transaction originated. In the above example, when the transaction for node 27-*b* was presented to merge processor 7, merge processor 7 would compare "Keith Palmer," the prior value of the field as recorded by node 27-*b* to "Carl Lake," the present value of the field as recorded in central database 3. Detecting the mismatch, merge processor 7 may then generate a transaction to change the value "Greg Emerson" to "Carl Lake," and write that transaction to update log 15.

The above is one example of a collision and a resulting corrective action. Other types of collisions include, for example, an update to a row that has previously been deleted, inserting a row that has previously been inserted, and the like. Merge processing must detect and correct each of these collisions. This may be performed using any of a number of well-known methods, and is not discussed further.

FIG. 5 depicts the steps performed by merge processor such as central merge processor 7. Although it depicts merge processor 7 writing to central database 3 and to transaction log 15, it is equally representative of a node merge processor such as node merge processor 27-*a*, 27-*b* or 27-*c* updating a node database 23-*a*, 23-*b* or 23-*c*. Merge processing begins at step 141. In step 143, merge processor 7 finds the first unprocessed transaction on received log 19. In step 147, merge processor 7 selects a transaction from received log 19. In step 149, merge processor 149 attempts to update database 3 according to the transaction selected in step 147. In step 151, merge processor 7 determines whether the database update of step 149 failed due to a collision. If so, merge processor proceeds to step 153, which generates a corrective transaction Following the generation of the corrective transaction, the merge processor returns to step 149 and again attempts to update database 3. If no collision was detected in step 151, execution proceeds to step 157. In step 157, merge processing checks to see if it is executing on central computer 1. If so, step 155 is executed to journal the transaction to log 15. In any case, either if step 157 determines that the merge processing is being performed on a node or after step 155, execution proceeds to step 159. Step 159 checks to see if any transactions remain to be processed from log 19. If so, execution repeats from step 147, where the next transaction is selected. If not, merge processing exits in step 161.

Log Management

FIG. 6 depicts the steps to be performed by log manager 9 to prepare a partial transaction log such as partial transaction log 17-*a*, 17-*b*, or 17-*c*. The procedure depicted in FIG. 6 is executed for each node available to dock with central computer system 1. Log manager 9 begins execution in step 171. In step 173, Log Manager 9 finds the first unprocessed transaction for the node whose partial transaction log is being prepared. In step 175, log manager 9 selects a transaction for processing. In step 177, log manager 9 checks to see whether the selected transaction originated on the same node for which processing is being performed. If so, there is no need to route the transaction back to the node, and control proceeds to step 179. Step 179 checks to see whether there are any transactions remaining to be processed. If so, control is given again to step 175. If not, control passes to step 189, which records the last transaction that was processed for this node, and then exits at step 191. If the transaction originates in other than the same node as the node for which processing is being performed, control is given to step 181. Step 181 calls a visibility calculator to determine whether the selected transaction is visible to the node being processed. The Visibility calculator routine is described in detail further herein. In step 183, log manager 9 checks to see whether the visibility calculator determined that the transaction is visible. If it is not visible, control is passed to step 179, which performs as disclosed above. If the transaction is visible, control is passed to step 185. Step 185 writes a record for this transaction to the partial transaction log for the node being processed, for example, partial transaction log 17-*a* for node 21-*a*. In step 187, the log manager 9 records the last transaction that was processed for this node, and then passes control to step 179, which determines whether to select additional transactions or exit, as disclosed above.

Visibility Calculation

FIG. 7 depicts a flowchart describing the process a visibility calculator for calculating visibility for a docking object as invoked by step 181 of log manager 9. The visibility calculator is called with the node-id of the node for which visibility is being calculated, the docking object for which the visibility is being calculated, and the row-id of the docking object whose visibility id being calculated. The visibility calculator uses this information, in conjunction with information obtained from meta-data stored in the schema depicted in FIG. 2, to determine whether a particular transaction that updates a particular row of a particular docking object is visible to a particular node.

The Visibility calculator begins execution at step 201. In step 203, the visibility calculator makes a default finding that the transaction is not visible. Therefore, unless the visibility calculator determines that a transaction is visible, it will exit with a finding of no visibility. In step 205, the visibility calculator selects the first visibility rule associated with the docking object. This is done by finding the table S_DOBJ_VIS_RULE 71 associated with the current Docking Object as pointed to by table S_DOBJ 61. In step 205, the visibility calculator selects the row of table S_DOBJ_VIS_RULE 71 with the lowest value for field RULE_SEQUENCE.

In step 207, the Visibility Calculator checks the field RULE_TYPE for a value of "R." The value of "R" indicates that the rule is a SQL visibility rule. If so, the Visibility Calculator proceeds to step 209. In step 209 the Visibility Calculator obtains a SQL statement from field SQL_STATEMENT and executes it. An example of such an SQL statement might be:

SELECT 'X' FROM S_OPTY_EMP
WHERE OPTY_ID = :PrimaryRowId
AND EMP_ID = :NodeId;

This SQL statement causes a query to be made of application table S_OPTY_EMP. The query selects any records meeting two criteria. First, the records selected must have a field OPTY_ID, which is a row id or key, equal to the Primary Row-ID of the Docking Object whose visibility is being determined. Second, the records selected must have a field EMP_ID, which may be for example, an identifier of a particular employee, equal to the NodeId of the node for whom visibility is being determined. In ordinary language, this SQL statement will return records only if a row is found in a table that matches employees to opportunities, where the opportunity is equal to the one being updated, and the employee to whom the opportunity is assigned is the operator of the node.

This is a simplistic example, provided for maximum comprehension. More complex SQL statements are possible. For example, the rule:

```
SELECT 'X' FROM
&Table_Owner.S_ACCT_POSTN ap
&Table_Owner.S_EMP_POSTN ep
WHERE ap.POSITION_ID = ep.POSITION_ID
   AND ep.EMP_ID = :NodeId;
```

This rule queries the tables S_ACCT_POSTN (which relates a particular account with a particular position in the organization that is responsible for the account) and S_EMP_POSTN (which relates what employee corresponds to a particular position). The condition "ap.POSITION_ID=ep.POSITION_ID" requires finding a row in the account-to-position table that has the same position as a row in the employee-to-position table. The condition "ep.EMP_ID=:NodeId" further requires that the selected row in the employee-to-position table also have an Employee ID equal to the ID of the user of the Node for which visibility is being determined. In ordinary language, this condition allows visibility if the employee occupies the position that has responsibility for the account in the docking object being updated.

There is no particular limit to the complexity of the conditions in the SQL statement used to evaluate visibility. Particular implementations of SQL may impose limitations, and resource considerations may make it desirable to use less complex statements, but these limitations are not inherent in the invention.

Step 211 evaluates whether the execution of SQL_STATEMENT in step 209 returned any records. If records were returned, this indicates that the Node for which visibility is being checked has visibility to the docking object being processed. Accordingly, if records are returned, the Visibility Calculator proceeds to step 213. In step 213, the transaction is marked visible. Because no further rules need to be evaluated to determine visibility, the visibility calculator proceeds to step 228. Step 228 synchronizes the databases by determining whether the calculated visibility requires the insertion or deletion of a docking object into a particular node's partially replicated database. This may occur, for example, if a node is determined to have visibility to a docking object due to a change to a related docking object. For example, an owner of a node may be assigned to a particular activity that is related to a particular sales opportunity. As a result, the node should be provided with a copy of the object representing the sales opportunity.

FIG. 8 depicts the steps performed to synchronize a partially replicated database in response to a change in data visibility. Execution begins in step 241. In step 243, the Visibility Calculator references the visibility just calculated for a docking object. If the Docking Object is visible, execution proceeds to step 245. Step 245 references the S_DOBJ_INST table, to verify that a row exists for the Docking Object for the current node. If a row exists, this indicates that the node in question already has a copy of the referenced Docking Object, and the routine proceeds to step 255, where it exits. If, however, no row exists for the Docking Object at the node being processes, this indicates that the node in question does not have a copy of the Docking Object on its partially replicated database. The routine then proceeds to step 247, where a transaction is generated to direct the node to insert the Docking Object into its partially replicated database.

If step 243 determines that the Docking Object is not visible, execution proceeds to step 249. Step 249 references the S_DOBJ_INST table, to verify that no row exists for the Docking Object for the current node. If step 243 determines that no row exists in the S_DOBJ_INST table for the current docking object for the current row, this indicates that the node in question does not have a copy of the referenced Docking Object, and the routine proceeds to step 255, where it exits. If, however, a row exists for the Docking Object at the node being processed, this indicates that the node in question does have a copy of the Docking Object on its partially replicated database. The routine then proceeds to step 251, where a transaction is generated to direct the node to delete the Docking Object from its partially replicated database.

Referring again to FIG. 7, following the data synchronization routine of step 228, the Visibility Calculator proceeds to step 229, where it exits. Referring to FIG. 6, as previously described, the resulting finding of visibility is available to be checked by the log manager in step 183 to determine to write the transaction.

Referring again to FIG. 7, if step 211 determines that no records were returned by the execution of the SQL statement in step 209, execution proceeds with step 215. Step 215 checks to see whether there are any remaining visibility rules to be assessed. If not, the visibility calculator proceeds to step 228 to synchronize the database, and then to step 229, where it exits. In this case, the default mark of no visibility that was set in step 203 remains set. This value will also be used by the log manager as shown in FIG. 6, step 183, to determine not to write the transaction.

Referring again to FIG. 7, if rules remain to be assessed, control proceeds to step 217, which selects the next rule to be processed. Control is then given again to step 207 to begin processing the new rule.

The preceding text provided a description of the processing or SQL visibility rule; that is, visibility rules of type "R." If step 207 determines that the visibility rule is not of type "R," the visibility rule is of type "O." Type "O" indicates a docking-object visibility rule. In such a case, the docking object being processed will be considered to be visible if it is related to a particular related docking object that is visible. If field RULE_TYPE is not equal to "R," then execution proceeds to step 221. Step 221 determines the related Docking Object whose visibility must be determined to determine whether the current docking object is visible. The related Docking Object identifier is obtained from field CHECK_DOBJ_ID in table S_DOBJ_VIS_RULE 71. In step 223, the Visibility Calculator determines which row in the related Docking Object must be queried for visibility. In order to determine this, the Visibility Calculator obtains a predetermined SQL statement from the field SQL_STATEMENT and executes it. The SQL statement is a query that select one or more rows of the Docking Object that, for example, correspond to the docking object for which the Visibility Calculator was invoked.

For example, assume that it is desired to indicate that a record for a sales opportunity should be visible if the Node has visibility to any sales quote made for that sales opportunity. This may be accomplished using the following SQL statement:

```
SELECT"ROW_ID" FROM
    &Table_Owner.S_DOC_QUOTE
    WHERE OPTY_ID=:Primary RowId
```

This SQL statement accesses a table S_DOC_QUOTE that contains all sales quotes. The WHERE clause specifies retrieval of all rows where the Opportunity ID of the row is equal to the Row-ID of the opportunity for which visibility is being calculated. The Visibility manager retrieves the specified Row-Ids, thereby identifying the rows of the S_DOC_QUOTE table whose visibility must checked.

Having determined the a related docking object and the row-ID of that related docking object upon whose visibility the visibility of the current docking object depends, the Visibility Calculator proceeds to step 225. In step 225, the Visibility Calculator recursively invokes itself to determine visibility of the related docking object. The recursively invoked Visibility Calculator operates in the same manner as the Visibility Calculator as called from the Log Manager 9, including the capability to further recursively invoke itself. When the recursive call concludes, it returns a visibility indicator for the related Docking Object, and control proceeds to step 227. In step 227, the Visibility calculator determines whether the related Docking Object was determined to have been visible. If so, the Visibility Calculator proceeds to step 213 to mark the originally current Docking Object as visible, and then to step 228 to synchronize the database and then to step 229 to exit. If the related Docking Object was not determined to be visible, control proceeds to step 215 to determine whether additional visibility rules remain to be assessed.

The Visibility Calculator, in conjunction with the Log Manager is therefore able to determine what subset of update transaction data is required to be routed to any particular node. This operation serves to reduce the transmission of unneeded data from the Central Computer 1 to the various nodes such as nodes 21-a, 21-b and 21-c that utilize partially replicated databases, and to reduce the system resources such as disk space needed to store, and the CPU time needed to process, what would otherwise be required to maintain a fully replicated database on each remote node.

The operation of the log manager 9 in conjunction with the Visibility Calculator herein described will be apparent from reference to the description and to the drawings. However, as a further aid in the description of these facilities, a pseudocode representation of these facilities is hereto attached as an Appendix.

Batch Visibility Calculation

The calculation of visibility events and the routing of visible transactions may be optimized by batching related SQL statements, rather than performing successive row-by-row operations. This optimization is achieved by eliminating redundant operations, using set processing and reducing network traffic. Redundant work is eliminated by denormalizing key data used to calculate visibility into the transaction log. For example, the Log Manager the docking object, primary table id, visibility event flags, and related data are stored in the transaction log table. Instead of calculating this data once for every mobile client, Log Manager calculates this data once for all mobile clients to use. Log Manager uses set processing by submitting SQL statements to check the visibility of many thousands of transactions simultaneously instead of submitting a SQL statement for each transaction. Network traffic is reduced by retrieving only the visible transactions from the database server to the docking server. Consequently, significantly less data travels over the network from the database server to the docking server.

FIG. 9 depicts the structure of the database design of the Transaction Log Table 300 used to support batch visibility checking. Node table 301 is the central table of the database, and contains one-to-many pointers to Dock Object Instance table 302, Dock Status table 304, and Transaction table 306.

Docking Object Instance table 302 stores whether a docking object instance is visible to a mobile client and has been downloaded to the mobile client. A row exists in Docking Object Instance table 302 if the docking object instance is-fully visible or partially visible to the mobile client. If the docking object is not visible, then a row for the docking object instance does not appear in Docking Object Instance table 302. Docking Object Instance table 302 (S_DOBJ_INST) comprises the following fields to support batch visibility checking:

NODE_ID: a non-null user key of the node to which this docking object instance relates.

DOBJ_ID: a non-null user key of the docking object to which this docking object instance relates.

PR_TBL_ROW_ID: a non-null user key containing the Row_ID of the primary table in the docking object. This value identifies the Docking Object Instance.

STAT_Flag: a one-byte flag containing the value 'F' or 'P'. The value 'F' indicates that the docking object instance is fully visible. The value 'P' indicates that the docking object instance is partially visible.

LAST_CHK_TXN_ID: the transaction ID of the transaction in which the visibility of the dock object instance was last checked. This value may be used to determine when the dock object instance must be recalculated. For example, if LAST_CHK_TXN_ID=3000, then Log Manager should not re-calculate visibility of the dock object instance until a visibility event occurs after transaction ID 3000.

Dock Status table 304 stores status information relating to each mobile client. This includes the identity of the last file merged, the last file extracted, and the last transaction extracted. Dock Status Table 304 (S_DCK_STAT) comprises the following fields to support batch visibility checking:

ROW_ID: primary key.

NODE_ID: Identity of the mobile client that owns this status information.

TYPE: This field is used to interpret the VAL field, and contains one of the strings "EXTRACT_RECORD", "LOG_EXTRACT", "MERGE_RECORD", "LAST_MERGE", or "SESSION".

VAL: This field contains the value corresponding to the data type in the TYPE field.

In addition, this table records the last transaction processed by an executable program called the Log Preprocessor. This is indicated in the VAL field for a row with a ROW_ID of zero and a TYPE of "EXTRACT_RECORD".

Transaction table 306 stores transaction that may need to be routed to all mobile clients. Transaction table 306 (S_DCK_TXN_LOG) comprises the following fields to support batch visibility checking:

TXN_ID: A non-null primary key that identifies the transaction.

DOBJ_ID: a non-null user key of the docking object to which this docking object instance relates.

PR_TBL_ROW_ID: a non-null user key containing the Row_ID of the primary table in the docking object. This value identifies the Docking Object Instance.

VIS_EVT_FLG: This field contains either the value 'Y' or 'N', and indicates whether the transaction causes a visibility event.

VIS_LEVEL_FLG: This field indicates the visibility level of the dock object. A value 'L' indicates that the dock object has limited visibility. A value of 'P' indicates that the dock object is private. A value of 'E' indicates that this object has enterprise visibility.

Batch visibility checking executes in four phases. Briefly, Phase 1 is run one for each transaction in Transaction Log Table 300 and denormalizes the transaction log data into the constituent tables. Phase 2 is run once per mobile client per iteration, and checks for visibility events for a mobile client. Phase 3 is run once per mobile client per iteration, and extracts visible transactions for the mobile client. Phase 4 is run once per iteration and deletes transactions from Transaction Log Table 300. Detailes of all four phases are described below.

In an embodiment of the present invention, phases 1 and 4 may be combined into a single executable program called the Log Preprocessor. Only one Log Preprocessor is run against an installation at any one time. Phases 2 and 3 may be combined into a single executable program called the Log Router. One or more Log Routers may be run against a single installation concurrently. The Log Router program may use semaphores to prevent more than one Log Router from routing transactions to the same mobile client simultaneously.

Phase 1 is run one for each transaction in Transaction Log Table 300 and denormalizes the transaction log data into the constituent tables. This phase denormalizes values in S_DCK_TXN_LOG based on transaction log data. The following pseudocode describes the operation of Phase 1 in detail:

```
DoPhase1( )
{
    -- Get status values so we can identify which txns to pre-process
    Get max(TXN_ID) from S_DCK_TXN_LOG
    Get TXN_PROCESSED_ID from S_DCK_STAT for Node id 0
    numTxns := 0;
    -- SELECT tl.*
    --   FROM S_DCK_TXN_LOG tl
    --  WHERE TXN_ID > max(TXN_PROCESSED_ID)
    --    AND TXN_ID <= max(TXN_ID)
    --  ORDER BY TXN_ID ASC
    FOR each txn between max(TXN_ID) and
    TXN_PROCESSED_ID LOOP
        -- If the client program already calculated the denormalized
        -- columns, then we don't have to do it again.
        IF tl.DOBJ_ID is not null THEN
            continue;
        END IF;
        FOR each operation in the txn LOOP
            -- Use UTLIdSql( ) to get primary table row_ids
            -- Assumes that each txn can only have one primary
            row_id
            FOR each primary id row LOOP
                IF operation is a visibility event THEN
                    p_vis_evt_flg := 'Y';
                ELSE
                    p_vis_evt_flg := 'N';
                END IF;
                update S_DCK_TXN_LOG
                set (DOBJ_ID, PR_TBL_ROW_ID,
                    VIS_EVT_FLG)
                    = (DOBJ_ID, PR_TBL_ROW_ID,
                      p_vis_evt_flg)
                where TXN_ID = current txn_id;
            END IF;
        END LOOP; -- each operation
        numTxns := numTxns + 1;
    END LOOP; -- each txn
    -- Commit after every N txns
    IF numTxns > maxTxns THEN
        Set TXN_PROCESSED_ID = current TXN_ID
        commit;
        numTxns := 0;
        -- lock the row again
        Get TXN_PROCESSED_ID from S_DCK_STAT for
        Node id 0
    END IF;
END LOOP; -- for loop
```

Phase 2 is run once per mobile client per iteration, and checks for visibility events for a mobile client. This phase looks for all visibility event transactions and recomputes visibility. The phase downloads and removes Docking Obect instances in response to visibility changes and stores the visibility of Docking Object instances in table S_DOBJ_INST 63. The following pseudocode describes the operation of Phase 2 in detail:

```
ProcessVisibilityEvent (DOBJ_ID, PR_TBL_ROW_ID, STAT_FLG)
{
    -- If we have already calculated visibility for this dobj
    -- instance in this iteration, then we do not need to
    -- recheck visibility.
    IF already check visibility for this dobj instance THEN
        return;
    END IF;
    -- Flush the S_DOBJ_INST table cache
    Call UTLNodeDObjInstFlush( )
    -- Compute visibility
    Run SQL rules, Check Dock Object rules.
    -- Reconcile S_DOBJ_INST table and do downloads/removes
    as needed
    -- If visibility has changed, stuff the value of
    TXN_PROCESSED_ID
    -- into S_DOBJ.LAST_CHK_TXN_ID
    -- NOTE: we can also stuff in the value of max(TXN_ID) so
    we do not
    --    download txns affecting the dobj instance until after the
    --    current max(TXN_ID)
    Call LOGReconcileDObjInst( )
}
DoPhase2 (NODE_ID)
{
    -- Get status values so we can identify which txns to pre-process
    Get VIS_CHECK_RECORD from S_DCK_STAT
        -- new status for vis checks high water mark
    Get TXN_PROCESSED_ID from S_DCK_STAT for Node Id 0
    -- Don't do anything if there are no new txns to process
    IF TXN_PROCESSED_ID = VIS_CHECK_RECORD THEN
        return;
    END IF;
    Open the .dx file for writing
    -- Get visibility event txns, and load visibility
    -- cache simultaneously
    -- SELECT tl.TXN_ID, tl.OPERATION, tl.VIS_EVT_FLG,
    --    tl.DOBJ_ID, tl.PR_TBL_ROW_ID, di.STAT_FLG,
    --    di.LAST_CHK_TXN_ID
    --   FROM S_DOBJ_INST di,
    --        S_DCK_TXN_LOG tl
    --  WHERE tl.TXN_ID > VIS_CHECK_RECORD
    --    AND tl.TXN_ID <= TXN_PROCESSED_ID
    --    AND tl.TXN_ID <= VIS_CHECK_RECORD + batch_size
    --    (Oracle & Informix)
    --    AND (tl.OPERATION in ('i', 'u') // set-based txn
    --     or tl.VIS_EVT_FLG = 'Y')
```

```
-- AND tl.PR_TBL_ROW_ID = di.PR_TBL_ROW_ID (+)
-- AND tl.DOBJ_ID = di.DOBJ_ID (+)
-- AND tl.VIS_LEVEL_FLG = 'L'/* limited visibility */
-- AND di.NODE_ID (+) = :node id
-- AND TXN_ID >di.LAST_CHK_TXN_ID
-- ORDER BY tl.TXN_ID
-- NOTE: on Sybase, use set rowcount to limit batch size
--   On Oracle & Informix, we assume that not many TXN_ID
--   values are lost if the db server crashes and restarts.
numTxns := 0;
Set VIS_CHECK_RECORD:= old VIS_CHECK_RECORD;
FOR each vis event txn or set-based txn in the batch LOOP
    -- We got a set-based txn
        ProcessVisibilityEvent (tl.DOBJ_ID,
            ts.PR_TBL_ROW_ID, di.STAT_FLG)
        END LOOP;
    ELSE
        ProcessVisibilityEvent (tl.DOBJ_ID,
            ts.PR_TBL_ROW_ID, di.STAT_FLG)
    END IF;
    IF amount written to .dx file > threshold THEN
        Close and compress the .dx file
        Increment LOG_EXTRACT counter in S_DCK_STAT
        Add .dx file to list of files that were written
        (do not write to server.tx file yet)
    END IF;
    Set VIS_CHECK_RECORD = current_txn_id
END LOOP;
IF Phase3 is separate program THEN
    -- Do this part if Phase 3 is a separate program
    IF txns were downloaded/removed to the current .dx file THEN
        Close and compress the .dx file
        Increment LOG_EXTRACT counter in S_DCK_STAT
        Add .dx file to list of files that were written
    ELSE
        Delete the .dx file
    END IF
    -- Commit at the end of the batch
    commit;
END IF;
}
```

Phase 3 is run once per mobile client per iteration, and extracts visible transactions for the mobile client. The following pseudocode describes the operation of Phase 3 in detail.

```
DoPhase3 (NODE_ID)
{
    IF Phase2 is a separate program THEN
        Open the .dx file for writing
    END IF;
    -- Get status values so we can identify which txns to extract
    Get VIS_CHECK_RECORD from S_DCK_STAT
    Get EXTRACT_RECORD from S_DCK_STAT
    -- SELECT tl.TXN_ID
    -- FROM S_DCK_TXN_LOG tl
    -- WHERE tl.TXN_ID > EXTRACT_RECORD
    --   AND tl.TXN_ID <= VIS_CHECK_RECORD
    --   AND (tl.VIS_EVT_FLG = 'E'/* enterprise visible */
    --   or (tl.VIS_EVT_FLG = 'L'/* limited visible */
    --       and exists
    --       (select 'visible'
    --        from S_DOBJ_INST di
    --        where tl.DOBJ_ID = di.DOBJ_ID
    --          and tl.PR_TBL_ROW_ID = di.PR_TBL_ROW_ID
    --          and di.NODE_ID = 'node_id'
    --          and tl.TXN_ID > di.LAST_CHK_TXN_ID)
    --   )
    -- )
    -- ORDER BY TXN_ID ASC
    numTxns := 0;
    FOR each visible txn between EXTRACT_RECORD and
VIS_CHECK_RECORD LOOP
        Write the txn to the .dx file
        numTxns := numTxns + 1;
        IF amount written to .dx file > threshold THEN
            Close and compress the .dx file
            Increment LOG_EXTRACT counter in S_DCK_STAT
            Add .dx file to list of files that were written
        END IF;
    END LOOP;
    Set EXTRACT_RECORD = VIS_CHECK_RECORD;
    IF txns were downloaded/removed/written THEN
        Close and compress the .dx file
        Increment LOG_EXTRACT counter in S_DCK_STAT
        Add .dx file to list of files that were written
    ELSE
        Delete the .dx file
    END IF
    -- Commit at the end of the batch
    commit;
```

Phase 4 is run once per iteration and deletes obsolete transactions from Transaction Log Table 300, including its substituent Transaction table 306 and Set Transaction ID table 308. The following pseudocode describes the operation of Phase 4 in detail.

```
DoPhase4 ( )
{
    -- Get status values so we can identify which txns to delete
    Get max(EXTRACT_RECORD) from S_DCK_STAT
    Get max(EXTRACT_RECORD) from last iteration
    -- No new txns to delete
    IF max(EXTRACT_RECORD) = last iteration THEN
        return;
    END IF;
    -- DELETE FROM S_DCK_TXN_LOG
    --   WHERE TXN_ID <= max(EXTRACT_RECORD)
    Delete from S_DCK_TXN_LOG
    -- Commit at the end of the batch
    commit;
```

Visibility Caching

Improved performance may be obtained by providing a capability of caching recent visibility events. The S_DOBJ_INST table 63 is particularly suitable to provide such a "visibility cache." The existence of a particular docking object instance in S_DOBJ_INST table 63 may be used to assert that the docking object instance is visible to the mobile client.

The visibility cache improves performance in two ways. First, it reduces the number of times visibility must be calculated. Log Manager 9 can use the cache in memory to determine visibility of a docking object instance when the transaction is on a table that does not cause implicit visibility events (i.e. the VISIBILITY_EVT_FLG is not checked for the table). Log Manager does not need to run any visibility SQL statements to determine the visibility of the transaction. Note that, if a transaction affects a table that can cause a visibility event, Log Manager must re-run the visibility SQL statements to determine that transaction's visibility.

Second, the visibility cache reduces the number of SQL statements executed per visibility calculation. Log Manager uses the cache to determine visibility of check docking objects. Log Manager does not need to recursively run visibility rule SQL statements on each check docking object instance to determine the visibility of the transaction. Instead, Log Manager 9 joins to the S_DOBJ_INST table 63 to determine the visibility of check docking objects.

As discussed earlier, the log manager uses two types of visibility rules, which can be summarized as SQL rules and Check-docking-object rules. An SQL rule is an SQL fragment that expresses whether the docking object instance is visible. An example of a visibility condition specified by an SQL rule for the opportunity docking object is "An Opportunity is visible if the sales rep is on the sales team." A check-docking-object rule indicates that a docking object instance is visible if another docking object is visible. The definition of a check-docking-object rule contains a SQL fragment that tells the Log Manager how to get all the check docking objects for the docking object instance. An example of a visibility condition specified by a check-docking-object rule for the opportunity docking object is "An Opportunity is visible if the Opportunity is used by a Quote that is visible to the sales rep."

SQL rules are relatively inexpensive in execution resources. In contrast, Check-docking-object rules consume more resources and are therefore more expensive. In order to execute a check-docking-object rule, Log Manager recursively runs visibility SQL statements for the docking object it is checking. Determining visibility of a transaction can require running hundreds, or even thousands of SQL statements. Some objects may have eight to ten check-docking-object rules. Running all the visibility rule SQL statements for these objects could take between 0.25 seconds and several seconds for each mobile client. As the number of mobile clients increases, this can lead to undesirably low levels of service.

Log Manager also uses the S_DOBJ_INST table to track whether a docking object instance (e.g., a particular Opportunity instance) has been downloaded to a mobile client. The S_DOBJ_INST table prevents Log Manager from downloading a docking object instance that was already previously downloaded, or removing a docking object instance that was already previously removed.

The visibility cache is implemented in two ways. First, the S_DOBJ_INST table is used for transactions on non-visibility event tables. When checking visibility of a transaction, if the transaction is on a table that does not cause visibility events (S_DOBJ_TBL.VIS_EVT_FLG='N'), then the S_DOBJ_INST table is used to determine if the docking object instance is visible. If the docking object instance of the transaction exists in the S_DOBJ_INST table, then the transaction is visible to the mobile client. Otherwise, the transaction is not visible to the mobile client. The benefit is that the Log Manager does not need to run any visibility SQL rules or check-docking-object rules to determine the visibility.

Second, the S_DOBJ_INST table is used to determine visibility of check-docking-objects. Most of the check-docking-object rules may be converted to SQL rules that join the check-docking object to the S_DOBJ_INST table. If any check-docking object exists in the S_DOBJ_INST table, then the check-docking object must be visible to the mobile client. The benefit is that the Log Manager runs at most one SQL statement to determine visibility of a check-docking object.

The following example shows the benefits of the visibility cache. Without the visibility cache, the set of rules used to check visibility of a docking object representing an account might be expressed as the following four rules.

Rule 1 (SQL): Account is visible if Account is a competitor:

primary_table.CMPT_FLG='Y'

Rule 2 (SQL): Account is visible to sales rep if sales rep is on the Account Team:

```
exists (select 'X' from S_ACCNT_POSTN ap, S_EMP_POSTN ep
   where ap.OU_EXT_ID = primary_table.ROW_ID
      and ep.EMP_ID = :person_id)
```

Rule 3 (Check-Docking-Object): Account is visible if it is an account for an Opportunity that is visible:

select OPTY_ID from S_OPTY_ORG oo
   where OU_ID=:primary_row_id

Rule 4 (Check-Docking-Object): Account is visible if it is an account for a Quote that is visible:

select ROW_ID from $S_1$.DOC_QUOTE
   where OU_ID=:primary_row_id

To check the visibility of an Account docking object without a visibility cache, Log Manager performs the following steps to generate and execute SQL statements based on the above visibility rules.

Step 1: OR together the SQL rules and execute the result:

```
select 'X' from S_ORG_EXT primary_table
   where primary_table.ROW_ID = :primary_table_row_id
      and ((primary_table.CMPT_FLG = 'Y')
         or exists (select 'X' from S_ACCNT_POSTN ap,
            S_EMP_POSTN ep
         where ap.OU_EXT_ID = primary_table.ROW_ID
            and ep.EMP_ID = :person_id)
)
```

Step 2: Execute Rule 3, the check-docking-object rule for the Opportunities object:

select OPTY_ID from S_OPTY_ORG oo
   where OU_ID=:primary_row_id

For each opportunity retrieved, execute the visibility rule SQL statements (SQL rules and check docking object rules) to determine whether the opportunity is visible. This can be many SQL statements.

Step 3: Execute the check docking object rule for the Quotes object:

select ROW_ID from S_DOC_QUOTE
   where OU_ID=:primary_row_id

For each quote retrieved, the visibility rule SQL statements (SQL rules and check docking object rules) are executed to determine whether the quote is visible. This can be many SQL statements.

The total number of SQL statements executed by this process may be computed as 1+(Opty Check Objs*Opty vis rules)+(Quote Check Objs*Quote vis rules). This may be anywhere from one statement to several hundred statements, depending on the number of Opportunity and Quotes objects retrieved.

With the visibility cache, the set of rules used to check visibility of a docking object representing an account might be expressed as the following four rules. The two SQL rules 1 and 2 are unchanged; the two check-dock-object rules have been replaced with SQL rules that interrogate the S_DOBJ_INST table.

Rule 1 (SQL): Account is visible if Account is a competitor:

primary_table.CMPT_FLG='Y'-

Rule 2 (SQL): Account is visible to sales rep if sales rep is on the Account Team:

```
exists (select 'X' from S_ACCNT_POSTN ap, S_EMP_POSTN ep
    where ap.OU_EXT_ID = primary_table.ROW_ID
        and ep.EMP_ID = :person_id)
```

Rule 3 (SQL): Account is visible if it is an account for an Opportunity that is visible:

```
exists (select 'X' from S_OPTY_ORG oo, S_DOBJ_INST di
    where oo.OU_ID = :primary_row_id
        and oo.OPTY_ID = di.PR_TBL_ROW_ID
        and di.DOBJ_ID = :dobjid and di.NODE_ID = :nodeid)
```

Rule 4 (SQL): Account is visible if it is an account for a Quote that is visible:

```
exists (select 'X' from S_DOC_QUOTE q, S_DOBJ_INST di
    where q.OU_ID = :primary_row_id
        and q.ROW_ID = di.PR_TBL_ROW_ID
        and di.DOBJ_ID = :dobjid and di.NODE_ID = :nodeid)
```

To check the visibility of an Account docking object using a visibility cache, Log Manager generates and executes a single SQL statement derived from the four SQL rules. Log manager Ors together all four SQL rules to obtain a single SQL rule, as follows:

```
select 'X' from S_ORG_EXT primary_table
    where primary_table.ROW_ID = :primary_table_row_id
        and ((primary_table.CMPT_FLG = 'Y')
            or exists (select 'X' from S_ACCNT_POSTN ap,
                S_EMP_POSTN ep
                    where ap.OU_EXT_ID = primary_table.ROW_ID
                        and ep.EMP_ID = :person_id)
            or exists (select 'X' from S_OPTY_ORG oo,
                S_DOBJ_INST di
                    where oo.OU_ID = :primary_row_id
                        and oo.OPTY_ID = di.PR_TBL_ROW_ID
                        and di.DOBJ_ID = :dobjid
                        and di.NODE_ID = :nodeid)
            or exists (select 'X' from S_DOC_QUOTE q,
                S_DOBJ_INST di
                    where q.OU_ID = :primary_row_id
                        and q.ROW_ID = di.PR_TBL_ROW_ID
                        and di.DOBJ_ID = :dobjid
                        and di.NODE_ID = :nodeid)
        )
```

This single SQL statement accomplishes the same result as the potentially hundreds of SQL statements that would be required without the visibility cache.

Because the SQL statements can get very large, it is advisable to establish a limit to the number of SQL rules that will be ORed together by Log Manager. This limit is preferably parameter-driven to permit ease of customization for a particular configuration. In some implementations, it may be useful to limit the number of tables in the SQL statement to about 16.

The following SQL fragments each provide a mechanism for joining to the S_DOBJ_INST table. The fragment that is best for a particular implementation may vary depending on the performance characteristics for that implementation.

```
Alternative 1:
    or (exists (select 'X' from S_OPTY_ORG oo, S_DOBJ_INST di
        where oo.OU_ID = :primary_row_id
            and oo.OPTY_ID = di.PR_TBL_ROW_ID
            and di.DOBJ_ID = :checkdobjid
            and di.NODE_ID = :nodeid)
    )
Alternative 2:
    or (exists (select 'X' from S_DOBJ_INST di
        where di.DOBJ_ID = :checkdobjid
            and di.NODE_ID = :nodeid
            and di.PR_TBL_ROW_ID in (
                select OPTY_ID from S_OPTY_ORG oo
                    where oo.OU_ID = :primary_row_id))
    )
Alternative 3:
    or (exists (select OPTY_ID from S_OPTY_ORG oo
        where oo.OU_ID = :primary_row_id
            and OPTY_ID in
                (select PR_TBL_ROW_ID from S_DOBJ_INST di
                    where di.NODE_ID = :nodeid
                        and di.DOBJ_ID = :checkdobjid
                        and di.STATUS_FLG = :vistype))
    )
```

The following pseudocode shows the algorithm for the visibility checking engine using the visibility cache. The algorithm is documented as four routines, denoted as CheckTxnVisibility, CheckObjectVisibility, CheckSqlRule and CheckOtherRule.

CheckTxnVisibility

—Check if a record in the txn log is visible to a Laptop-NodeId

—Also processes implicit visibility events and related dock objects static BOOL CheckTxnVisibility (LaptopNodeId, Table, RowId, *peVisible)

```
{
Find the Table in the Dictionary;
IF Table not found THEN
    Error: Table not defined
END IF;
-- set to not visible by default
*peVisible = 'None';
FOR all docking objects that the table belongs to LOOP
    -- Generate SQL to get PrimaryId values of the Docking Object
    GeneratePrimaryIdSQL (Table, RowId, DockingObject);
    FOR each PrimaryId value retrieved LOOP
        -- Enhancement #1: use cache for non-visibility events
        -- txn is for a table that does not cause visibility
        -- events and the txn is not an insert on the dock object's
        -- primary table (this is a new dock object instance).
        -- Do not need to do visibility calculation. No implicit
        -- visibility events and no related dock object processing
        IF Table.visibilityEventFlag = 'N'
            && not an insert into DockObjectPrimaryTable THEN
            Find the object instance in the S_DOBJ_INST table
            IF status = 'Full' THEN
                *peVisible = 'Full'
            ELSIF status = 'Partial' THEN
                *peVisible = 'Partial'
            ELSE
                *peVisible = 'None'
            END IF;
        ELSE
            -- Must recalculate visibility
            CheckObjectVisibility (LaptopNodeId, PrimaryTable,
                PrimaryRowId, depth = 0, peVisible);
        END IF;
        -- Process implicit visibility events and related dock objects
        ReconcileObjectInstance (LaptopNodeId, PrimaryTable,
            PrimaryRowId, &eVisible);
```

```
            -- If we need to process implicit visibility events, then
            -- continue looping through all docking objects even if we
            -- already know that the Txn is visible.
            IF *peVisible in ('Full', 'Partial') THEN
                IF Table.visibilityEventFlag = 'N' THEN
                    return TRUE;
                END IF;
            END IF;
        END LOOP;
    END LOOP;
    return TRUE;
}
```

CheckObjectVisibility

—Check if a docking object instance is visible to the laptop user.

BOOL CheckObjectVisibility (NodeId, DObjName, PrimaryRowId, depth, *peVisible)

```
{
    -- Algorithm:
    -- Check FULL visibility
    --   Use SQL Rules ORed together
    --   Use Check Dock Object Rules one by one
    --
    -- Check PARTIAL visibility (iff depth == 0)
    --   Use SQL rules OR-ed together
    --   Use Check Dock Object Rules one by one
    --
    -- Flush the visibility cache to the S_DOBJ_INST table because
    -- the SQL rules will reference the cache.
    Flush the visibility cache to the S_DOBJ_INST table.
    -- Object is not visible.
    *peVisible = None;
    -- Check Visibility using SQL_RULES ORed together
    CheckSqlRule (NodeId, DObjName, PrimaryRowId, peVisible,
        depth, UTL_VIS_FULL);
    IF *peVisible == UTL_VIS_FULL THEN
        goto done;
    -- Check Visibility using Check Docking Objects
    CheckOtherRule (NodeId, DObjName, PrimaryRowId, peVisible,
        depth, UTL_VIS_FULL);
    IF *peVisible == UTL_VIS_FULL THEN
        goto done;
    IF depth == 0 THEN
        /* Check Visibility using SQL_RULES ORed together */
        CheckSqlRule (NodeId, DObjName, PrimaryRowId, peVisible,
            depth, UTL_VIS_PARTIAL);
        IF *peVisible == UTL_VIS_PARTIAL THEN
            goto done;
        /* Check Visibility using Check Docking Objects */
        CheckOtherRule (NodeId, DObjName, PrimaryRowId, peVisible,
            depth, UTL_VIS_PARTIAL);
        IF *peVisible == UTL_VIS_PARTIAL THEN
            goto done;
    END IF;
done:
    return TRUE;
}
```

CheckSqlRule

BOOL CheckSqlRule (NodeId, DObjName, PrimaryRowId, peVisible, depth, eVisType)

```
{
    -- Create the SQL statement
    -- "SELECT 'X' from <PrimaryTable>pt where
    -- pt.ROW_ID = <primary table row id>"
    WHILE (TRUE) LOOP
        -- Build the SQL statement by ORing the SQL rules together.
        FOR each visibility rule for the Docking Object LOOP
            -- Only append SQL statements that match the VisType
            -- (Partial or Full)
            IF RuleType != SQLRule ||RuleLocalFlag != eVisType
            THEN
                continue;
            END IF;
            -- Limit number of rules per statement to the one
            -- specified in the system preference.
            IF number_rules_appended = "LOG: vis rules per Stmt"
            THEN
                break;
            END IF;
            -- Add "<sql fragment>" to sql statement
            Append the SQL rule to the sql statement;
        END LOOP;
        -- Run the sql statement
        Run the select SQL statement using PrimaryRowId;
        IF any rows returned THEN
            -- row is visible
            *peVisible = eVisType;
            goto done;
        END IF;
        -- Stop if no more rules to run
        IF no more rules to append THEN
            break;
        END IF;
    END WHILE;
done:
    return TRUE;
}
```

CheckOtherRule

BOOL CheckOtherRule (NodeId, DObjName, PrimaryRowId, peVisible, depth, eVisType)

```
{
    -- Run check docking object rules
    FOR each visibility rule for the Docking Object LOOP
        -- Only run sql statements that match the VisType
        -- (Partial or Full)
        IF RuleType != CheckDockObjectRule
            ||RuleLocalFlag != eVisType THEN
            continue;
        END IF;
        Run the ParameterSQL using PrimaryRowId to get
        newPrimaryRowId
        FOR each record retrieved by ParameterSQL LOOP
            -- recursively check visibility
            CheckObjectVisibility (LaptopNodeId, CheckDObjName,
                newPrimaryRowId, depth + 1, peVisible);
            -- Stop as soon as the object is found to be visible!
            IF *peVisible in ('Full', 'Partial') THEN
                goto done;
            END IF;
        END LOOP;
done:
    return TRUE;
}
```

Degrees of Visibility

The docking process may be further enhanced by treating object visibility as a non-binary condition; that is, providing for an object to have a degree of visibility so that it may be visible in certain contexts and not visible in others. This may be provided for by associating a visibility strength with each dock object visibility rule. Visibility strength is a positive integer that states how visible a given dock object instance is.

Visibility strength provides an alternative to concepts off fully and partially visible dock object instances. Rather than specifying visibility as either full or partial, visibility strengths allow for an unlimited range of visibility for an object.

When a visibility rule passes, the dock object instance receives the visibility strength associated with the visibility rule. This visibility strength controls two aspects.

The first aspect controlled by visibility strength is the downloading or removal of member table rows. Each member table also has a visibility strength. Docking downloads (or removes) member table rows only if the dock object instance visibility strength is greater or equal to the member table visibility strength. This aspect may be used to limit the number of member table rows replicated to docking clients. For example, when an Account is visible due to a Quote, docking should download the Account header, but does not need to download rows in the Account Notes, Account Positions, and other member tables. Log Manager download and removal processing is improved because Log Manager can skip downloading and removing certain member tables. In addition, docking replicates fewer rows to the docking clients, and the docking clients occupy less disk space.

A second aspect controlled by visibility strength is the downloading or removal of related dock object instances. Each related dock object rule also has a visibility strength. When a dock object instance is visible, docking downloads (or removes) related dock object instances only if the dock object instance visibility strength is greater or equal to the related dock object rule visibility strength. This aspect may be used to follow a subsets of related dock objects depending on the reason why the dock object instance is visible. This allows docking to follow a subset of related dock objects even if a dock object instance is partially visible.

Visibility strength is implemented by adding new attributes to the repository dock object table, dock object visibility rules and dock object related dock object rules. These new attributes specify the visibility strengths of member tables, visibility rules and related dock object rules.

Each dock object visibility rule has a visibility strength. When a visibility rule passes, the dock object instance's visibility strength is equal to the highest visibility strength value of all visibility rules that pass. The dock object instance visibility strength specifies which member table rows to replicate to a docking client and which related dock object rules to run.

Check dock object visibility rules also have a check-dock-object visibility strength. The check-dock-object visibility strength value specifies that the current dock object instance is visible only if the other dock object instance has a visibility strength greater than or equal to the check-dock-object visibility strength value.

Visibility strength is indicated by an attribute VIS_STRENGTH that specifies the strength of the dock object instance. The semantics of this attribute may vary depending on the context of the table in which it appears, as more fully discussed herein. VIS_STRENGTH may have the following values:

0: not visible
5: partially visible
10: fully visible

A number of the tables in the database schema are modified to support the VIS_STRENGTH attribute. The S_DOCK_TABLE table stores the member tables for a docking object. Each docking object can have one or more member tables. The table contains an additional field, VIS_STRENGTH. VIS_STRENGTH is a numeric field containing the minimum visibility strength of the dock object instance for rows in this table to be downloaded. The field has a default value of 5, indicating that member table rows are downloaded if the dock object instance is partially visible.

The S_DOCK_VIS_RULE table stores the visibility rules for a docking object. Each docking object can have one or more visibility rules. The table contains an additional field, VIS_STRENGTH. VIS_STRENGTH is a numeric field containing the visibility strength of the dock object instance if the rule passes. The field has a default value of 5 (partially visible) if PARTIAL='y', and otherwise is set to 10. The S_DOCK_VIS_RULE table also includes a CHECK_VIS_STRENGTH field, used for check-dock-object rules (i.e., rules with ruleType='C'). This value represents the minimum visibility strength of the check dock object instance to make this visibility rule pass. The field has a default value of 10, requiring the check dock object to be fully visible, for ruleType='C', and is otherwise unused and set to 0.

The S_DOCK_REL_OBJ table stores the related dock object rules for a docking object. Each docking object can have one or more related dock object rules. The table contains an additional field, VIS_STRENGTH. VIS_STRENGTH is a numeric field containing the minimum visibility strength of the dock object instance for Log Manager to run this rule. It has a default value of 10, requiring full visibility. The S_DOCK_REL_OBJ table also includes a field REL_VIS_STRENGTH. This field contains a value that is used to provide a visibility strength value to related dock instances. It has a default value of 5.

The S_DOCK_INST table is a new table replacing S_DOBJ_INST, and stores the current visibility strength of a dock object instance for each docking client. It has the following fields. NODE_ID is a non-null unique key that indicates the docking client corresponding to this row. DOCK_ID is a non-null unique key that indicates the dock object corresponding to this dock object instance. PR_TBL_ROW_ID contains a key that is the primary table row id of the dock object instance. VIS_STRENGTH is a numeric field containing the current visibility strength of the dock object instance for the docking client.

The following SQL code may be used to define the S_DOCK_INST table:

```
create table S_DOCK_INST (
    NODE_ID    VARCHAR2(15) NOT NULL,
    DOCK_ID    VARCHAR2(30) NOT NULL,
    PR_TBL_ROW_ID  VARCHAR2(15) NOT NULL,
    VIS_STRENGTH NUMBER  NOT NULL
    );
create unique index S_DOCK_INST_U1 on S_DOCK_INST
    (NODE_ID, DOCK_ID, PR_TBL_ROW_ID, VIS_STRENGTH);
```

The S_DCK_TXN_LOG table stores the transactions to route to docking clients. The table contains an additional field, VIS_STRENGTH. VIS_STRENGTH is a numeric field containing the visibility strength of the table referenced by the transaction. This value is denormalized by the Log Preprocessor and is used by the Log Router. The following SQL code may be used to define the S_DCK_TXN_LOG table:

alter table S_DCK_TXN_LOG add (TBL_VIS_STRENGTH NUMBER);

Log Manager Processing

Log Manager routes a transaction to a docking client only if the dock object instance visibility strength is greater or equal to the member table visibility strength. The Log Preprocessor stores the member table visibility strength as a denormalized value in the transaction log table.

When Log Router processes visibility events, visibility rules are executed in decreasing order of visibility strength until a visibility rule passes. When a visibility rule passes, the dock object instance receives the visibility strength of the visibility rule that passes. If no visibility rule passes, then the dock object instance gets a visibility strength of none (value=0). After calculating the visibility strength, visibility strength of the dock object instance is written to the S_DOCK_INST table, unless the dock object instance has a visibility strength of 0.

When Log Router searches for visible transactions, a transactions is fetched only if the S_DOCK_INST table has a visibility strength that is greater than or equal to the visibility strength of the transaction log denormalized member table.

Log Manager uses the member table's visibility strength attribute to identify member table rows to download or remove: When the visibility strength of a dock object instance changes, Log Manager downloads or removes member table rows for the dock object instance. If the new visibility strength is greater than the old visibility strength, the referenced member table rows have not previously been downloaded and now should be downloaded. If the new visibility strength is less than the old visibility strength, then Log Manager removes member table rows that have previously been downloaded and should not now be downloaded.

When processing related dock object rules, Log Manager uses the visibility strength attribute of each rule to identify which related dock object rules to execute. When the visibility strength of a dock object does not change and the visibility strength is not None, Log Manager checks related dock object instances and verifies that their visibility strength have not changed. When the visibility strength of a dock object instance changes, Log Manager checks all related dock object instances and downloads or removes related dock object instances as needed. If the new visibility strength is greater than the old visibility strength, Log Manager executes the related dock object rules that have not previously been run and now should be run. If the new visibility strength is less than the old visibility strength, Log Manager executes the related dock object rules that have been previously run and now should not be run.

Log Manager uses the relVisStrength attribute of each rule to reduce visibility checking. If the new visibility strength is greater than or equal to the old visibility strength, and Log Manager finds a related dock object instance and the related dock object's relVisStrength is greater than or equal to the other dock object's maximum visibility rule visStrength, then Log Manager does not need to re-check visibility of other dock object instance. The related dock object instance visStrength is set to the related dock object's relVisStrength.

Simplified Docking Visibility Rules

The utility of the present invention may be made more useful by simplifying the docking visibility rules. Specifically, the docking visibility rules may be stored in a single location, the central dictionary, so that the database extraction process DBXtract and Log Manager can rely on the same definitions to extract and route transactions to mobile clients. Predefined docking visibility rules may also be provided to support commonly required visibility tasks such as position dependencies, employee dependencies, and check-dock-object rules. This approach provides several benefits.

First, storing all docking visibility rules in the central dictionary lets both Log Manager and DBXtract use the same definitions to route transactions to mobile clients, reducing the cost of maintaining docking visibility rules. This also eliminates the need to maintain DBXtract SQL scripts for each different database vendor (e.g. Sybase™, Oracle™, or Informix™). Second, it permits the definition of pre-defined visibility rules commonly used by vendor-supplied applications. These rules make it unnecessary to enter SQL fragments or define related docking object rules. 90% of all docking visibility rules for typical applications may use pre-defined visibility rules. Third, the central dictionary lets customers use the Docking Object List view to easily customize docking visibility rules to satisfy site-specific requirements. Customers can also easily activate or deactivate visibility rules by changing an attribute of a visibility rule. With simplified visibility rules, clients, such as end users, can change visibility rules using an easy-to-use graphical user interface. This improves performance for majority of customers by letting us define specialized visibility rules for a small set of customers as inactive rules and letting the customers activate the specialized rules. Customers that do not use the specialized rules do not incur the performance cost of the specialized rules. Fourth, storing all docking visibility rules in a unified location makes it easier to build future docking enhancements.

Simplified docking rules are implemented as follows. Five new types of visibility rules are defined and stored in the central dictionary.

1) Check-dock-object rules relate two docking object instance to each other without the use of a SQL fragment. Check dock object rules are similar to SQL rules except that a check dock object definition between two docking objects is stored instead of a SQL fragment. For example, an opportunity is visible if an activity that is fully visible uses the opportunity.

2) Position rules specify that a docking object instance is visible if an employee on the docking client occupies a position for the docking object. For example, an opportunity is visible if an employee on the docking client is an opportunity sales team member.

3) Position manager rules specify that the docking object instance is visible if an employee on the docking client is the manager of an employee that occupies a position for the docking object. For example, an opportunity is visible if an employee on the docking client is the manager of an opportunity sales team member.

4) Employee rules specify that a docking object instance is visible if an employee on the docking client is assigned to the docking object. For example, an activity is visible if an employee on the docking client is assigned to the activity. Employee rules are typically used for owner, creator, etc.

5) Employee manager rules specify that the docking object instance is visible if an employee on the docking client is the manager of an employee assigned to the docking object. For example, an activity is visible if an employee on the docking client is the manager of an employee assigned to the activity. Employee manager rules are typically used for manager of owner, manager of creator, etc.

In Log Manager, visibility SQL statements are generated from the central dictionary at runtime. Code is added to the visibility checker common API to generate and run SQL statements for the new visibility rule types. Log Manager's visibility event code is modified to use the new types of visibility rules to find related docking object instances.

FIG. 9 depicts a database diagram for the central dictionary. This diagram is akin to the schema of FIG. 2 with additional support added to the S_DOCK_VIS_RULE table, as follows.

The S_DOCK_VIS_RULE table contains the visibility rules associated with a particular Docking Object.

S_DOCK_VIS_RULE 71 contains the additional fields DOCK_ID, SEQUENCE, TYPE, ACTIVE and PARTIAL. Field DOCK_ID identifies the Docking Object with which a particular visibility rule is associated, referred to as the "current docking object." Field SEQUENCE is a sequence number that indicates the sequence, relative to other visibility rules in the table, in which the particular visibility rule should be run. The ACTIVE field indicates whether a particular rule is active or not. A value of 'Y' or null indicates that the rule is active, and a value of 'N' indicates that it is inactive. The field TYPE specifies the type of the particular visibility rule. A value of 'S' indicates an SQL rule; a value 'O' indicates a parameter dock object rule; a value 'C' indicates a check-dock-object rule; a value 'P' indicates a position rule; a value 'Q' indicates a position manager rule; a value 'E' indicates an employee rule; a value 'F' indicates an employee manager rule. The field PARTIAL, if set to 'Y', indicates that if the visibility rule is satisfied, the current docking object is partially visible. If set to 'N' or null, it indicates that if the visibility rule is satisfied, the current docking object instance is fully visible.

In addition the S_DOCK_VIS_RULE table contains a number of fields whose meaning and meaningfulness depends upon the rule type.

SQL rules use the fields SQL_STATEMENT and VIS_EVT_COLS. In this context, the SQL_STATMENT field is an SQL fragment that, if it returns any rows, indicates that the dock object instance is visible.

Parameter Dock Object Rules use the fields CHECK_DOCK_ID and SQL_STATMENT. In this context, CHECK_DOCK_ID contains a pointer to another docking object and SQL_STATEMENT contains an SQL statement to obtain the PrimaryID values for the other dock object. For each PrimaryID retrieved, Log Manager runs the visibility rule of the other dock object.

Check-Dock-Object rules use the fields CHECK_DOCK_ID, SRC_COLUMN_ID and TAR_COLUMN_ID. In this context, SRC_COLUMN_ID identifies the column in the current dock object that joins to the check-dock object and TAR_COLUMN_ID identifies the column in the check dock object that joins to the dock object join column. For the Check-Dock-Object type, the visibility event columns is implicit: all columns needed to join from the primary table of the current dock object to the dock object join column.

Position rules use the field POSTN_COLUMN_ID, which is a column in a member of table of the current dock object that points to the S_POSTN table. For Position rules, the visibility event columns is implicit: all columns needed to join from the primary table of the current dock object to the position column.

Position Manager rules use the field POSTN_COLUMN_ID, which is a column in a member of table of the current dock object that points to the S_POSTN table. For Position Manager rules, the visibility event columns is implicit: all columns needed to join from the primary table of the current dock object to the position column.

Employee rules use the field EMP_COLUMN_ID to identify a column in a member table of the current dock object that points to the S_EMPLOYEE table. For Employee rules, the visibility event columns are implicit: all columns needed to join from the primary table of the current dock object to the employee column.

Employee Manager rules use the field EMP_COLUMN_ID to identify a column in a member table of the current dock object that points to the S_POSTN table. For Employee Manager rules, the visibility event columns is implicit: all columns needed to join from the primary table of the current dock object to the employee column.

SQL statements are stored in the central dictionary memory structures for access by Log Manager and DBXtract. When the dictionary is loaded, SQL statements are generated and stored in the memory structures. Because the number of SQL statements are small, the generation code is expected to take less than one second. Alternatively, if the generation takes too long, the dictionary API may be modified to generate the SQL statements for a given dock object whenever the dock object is first referenced.

Appendix B describes the format SQL statements that Log Manager and DBXtract generate at runtime and provide an example of these SQL statements using the Accounts dock object.

CONCLUSION

Various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing therefrom.

What is claimed is:

1. A method of managing partial replication of a first database to a second database, comprising:
   (a) determining whether a visibility of the second database to data being propagated from the first database is stored in a cache memory, and if so, accessing the visibility from the cache memory, and if not,
      (i) determining the visibility, and
      (ii) storing the visibility in the cache memory; and
   (b) propagating said data from the first database to the second database only if the second database has visibility to the data.

2. The method of claim 1 wherein (a)(ii) comprises caching the visibility in a docking object instance table.

3. The method of claim 1 wherein (b) comprises asserting a docking object has visibility to a client associated with the second database when an instance of the docking object is in the cache memory.

4. The method of claim 3 wherein (b) further comprises:
   (a) determining an initial visibility event from a set of one or more Structured Query Language (SQL) statements applied against a visibility rules database; and
   (b) thereafter determining the cached visibility from a single SQL statement applied against the docking object instance table in the cache memory.

5. A computer-readable medium whose contents cause a computing system to manage partial replication of a first database to a second database by:
   (a) determining whether a visibility of the second database to data being propagated from the first database is stored in a cache memory, and if so, accessing the visibility from the cache memory, and if not, (i) determining the visibility, and
(ii) storing the visibility in the cache memory; and
(b) propagating said data from the first database to the second database only if the second database has visibility to the data.

6. A database data propagation computing system for partially propagating a central database to a partially replicated database, comprising:
a visibility determination subsystem that determines whether a visibility of a user of the partially replicated database to data being propagated is stored in a cache memory, and if so, accessing said visibility from said cache memory, and if not, determining said visibility and selectively storing said visibility in said cache memory; and
a propagation subsystem that propagates said data to the partially replicated database according to said visibility determined by said visibility determination subsystem.

7. The database data propagation computing system of claim 6, wherein the partially replicated database comprises a relational database.

8. The database data propagation computing system of claim 6, wherein the partially replicated database is intermittently in communication with the central database.

9. The database data propagation computing system of claim 6, wherein determinations by the visibility determination subsystem of whether a visibility of a user of the partially replicated database to data being propagated is stored in a cache memory comprise evaluating a visibility rule.

10. The database data propagation computing system of claim 9, wherein said visibility rule comprises a SQL statement.

11. The database data propagation computing system of claim 9, wherein said visibility rule comprises a check-docking-object rule.

12. A system for propagating data in a database, wherein the database includes a central database and a partially replicated database, the system comprising:
means for determining whether a visibility of a user of the partially replicated database to data being propagated is stored in a cache memory, and if so, accessing said visibility from said cache memory, and if not, determining said visibility and selectively storing said visibility in said cache memory; and
means for propagating said data to the partially replicated database according to said visibility.

13. The system of claim 12, wherein the partially replicated database comprises a relational database.

14. The system of claim 12, wherein the partially replicated database is intermittently in communication with the central database.

15. The system of claim 12, wherein the means for determining whether a visibility of a user of the partially replicated database to data being propagated is stored in a cache memory constitutes means for evaluating a visibility rule.

16. The system of claim 15, wherein said visibility rule comprises a SQL statement.

17. The system of claim 15, wherein said visibility rule comprises a check-docking-object rule.

18. One or more computer memories that together store a visibility cache data structure, comprising, for each of a plurality of data items residing in a first database, an indication of the outcome of earlier determining visibility of the data item by a second database,
such that the indications can be used to discern visibility of a selected data item among the plurality by the second database, and thereby determine whether to propagate the selected data item from the first database to the second database, without re-determining visibility of the selected data item by the second database.

19. The computer memories of claim 18, wherein each of the indications is the result of applying a visibility rule.

20. One or more generated data signals that together convey a data item propagation data structure, the data item propagation data structure containing a data item propagated from a first database to a second database as the result of querying a visibility cache indicating that the propagated data item is visible to the second database,
wherein the generated data signals together further convey a second data item propagation data structure, the second data item propagation data structure containing a second data item propagated from the first database to the second database as the result of applying a visibility rule to determine that the propagated data item is visible to the second database at a time when the visibility cache does not indicate whether the propagated data item is visible to the second database.

* * * * *

UNITED STATES PATENT AND TRADEMARK OFFICE
CERTIFICATE OF CORRECTION

PATENT NO. : 6,684,438 B2
DATED : February 3, 2004
INVENTOR(S) : Robert A. Brodersen et al.

It is certified that error appears in the above-identified patent and that said Letters Patent is hereby corrected as shown below:

<u>Title page,</u>
Item [75], Inventors, "Robert S. Brodersen" should be -- Robert A. Brodersen --;

<u>Column 4,</u>
Line 5, "filly" should be -- fully --;

<u>Column 5,</u>
Line 16, delete comma between "the" and "product";

<u>Column 9,</u>
Line 48, insert period after "transaction";

<u>Column 14,</u>
Line 16, delete hyphen between "is" and "fully";

<u>Column 24,</u>
Line 66, "off" should be -- of --;

Signed and Sealed this

Twenty-second Day of June, 2004

JON W. DUDAS
*Acting Director of the United States Patent and Trademark Office*